(12) United States Patent
Sakamoto et al.

(10) Patent No.: US 11,495,799 B2
(45) Date of Patent: Nov. 8, 2022

(54) SKELETON-FORMING AGENT AND NEGATIVE ELECTRODE USING SAME

(71) Applicant: ATTACCATO Limited Liability Company, Izumi (JP)

(72) Inventors: Taichi Sakamoto, Izumi (JP); Takashi Mukai, Izumi (JP); Yuta Ikeuchi, Izumi (JP); Naoto Yamashita, Izumi (JP); Daichi Iwanari, Kyoto (JP); Kazuma Yoshida, Kyoto (JP); Kazuyoshi Tanaka, Kyoto (JP)

(73) Assignee: ATTACCATO LIMIIED LIABILITY COMPANY, Izumi (JP)

( * ) Notice: Subject to any disclaimer, the term of this patent is extended or adjusted under 35 U.S.C. 154(b) by 105 days.

(21) Appl. No.: 16/464,391

(22) PCT Filed: Mar. 25, 2017

(86) PCT No.: PCT/JP2017/012199
§ 371 (c)(1),
(2) Date: May 28, 2019

(87) PCT Pub. No.: WO2018/096702
PCT Pub. Date: May 31, 2018

(65) Prior Publication Data
US 2019/0326601 A1 Oct. 24, 2019

(30) Foreign Application Priority Data
Nov. 25, 2016 (JP) .............................. JP2016-228753

(51) Int. Cl.
*H01M 4/62* (2006.01)
*H01M 10/0525* (2010.01)
(Continued)

(52) U.S. Cl.
CPC ......... *H01M 4/62* (2013.01); *H01M 10/0525* (2013.01); *H01M 4/13* (2013.01);
(Continued)

(58) Field of Classification Search
CPC ........ H01M 4/62; H01M 4/386; H01M 4/621; H01M 4/134; H01M 4/48; H01M 10/0525;
(Continued)

(56) References Cited

U.S. PATENT DOCUMENTS 5,580,686 A 12/1996 Shi et al.
5,824,434 A 10/1998 Kawakami et al.
(Continued)

FOREIGN PATENT DOCUMENTS

JP 6-283157 A 10/1994
JP 11-504157 A 4/1999
(Continued)

OTHER PUBLICATIONS

Mukai et al., "Development of lithium ion battery active material and electrode material technology", Science & Technology Co., LTD., 2014, ISBN:978-4-86428-089-1, pp. 269-311, w/English translation (93 pages).
(Continued)

*Primary Examiner* — Ula C Ruddock
*Assistant Examiner* — Matthew W Van Oudenaren
(74) *Attorney, Agent, or Firm* — WHDA, LLP

(57) ABSTRACT

To provide a negative electrode of a lithium ion battery excellent in cycle life characteristics. The negative electrode for a lithium ion battery includes an Si-based material as an active material, wherein a skeleton-forming agent including a silicate having a siloxane bond or a phosphate having an aluminophosphate bond as an ingredient is present on the surface and inside of an active material layer, and the
(Continued)

skeleton of the active material is formed with the skeleton-forming agent.

15 Claims, 22 Drawing Sheets

(51) Int. Cl.
  *H01M 4/02* (2006.01)
  *H01M 4/1395* (2010.01)
  *H01M 4/38* (2006.01)
  *H01M 4/134* (2010.01)
  *H01M 4/13* (2010.01)
(52) U.S. Cl.
  CPC .......... *H01M 4/134* (2013.01); *H01M 4/1395* (2013.01); *H01M 4/386* (2013.01); *H01M 4/621* (2013.01); *H01M 2004/027* (2013.01)
(58) Field of Classification Search
  CPC ......... H01M 2004/027; H01M 10/052; H01M 4/13; H01M 4/1395
  See application file for complete search history.

(56) References Cited

U.S. PATENT DOCUMENTS

| | | | |
|---|---|---|---|
| 5,856,045 A | 1/1999 | Fauteux et al. | |
| 2010/0129718 A1* | 5/2010 | Higuchi | H01M 4/134 |
| | | | 429/231.95 |
| 2012/0049108 A1 | 3/2012 | He et al. | |
| 2013/0216907 A1 | 8/2013 | Rayner et al. | |
| 2013/0244082 A1* | 9/2013 | Lee | H01M 4/485 |
| | | | 429/145 |
| 2014/0234705 A1* | 8/2014 | Yayamoto | H01M 4/505 |
| | | | 429/200 |
| 2016/0380307 A1 | 12/2016 | Akita et al. | |
| 2017/0092939 A1* | 3/2017 | Kim | H01M 4/1395 |

FOREIGN PATENT DOCUMENTS

| | | |
|---|---|---|
| JP | 11-144736 A | 5/1999 |
| JP | 2001-508916 A | 7/2001 |
| JP | 2005-190953 A | 7/2005 |
| JP | 2012-49108 A | 3/2012 |
| JP | 5293020 B2 | 9/2013 |
| JP | 2013-538777 A | 10/2013 |
| JP | 2015-115166 A | 6/2015 |
| JP | 5728721 B2 | 6/2015 |
| WO | 96/027910 A1 | 9/1996 |

OTHER PUBLICATIONS

Yanagida et al., "Performance and Safety of C/Si-based composites for Li-Ion Battery", The 83rd Electrochemical Society of Japan Lecture Abstracts, 2016, 1T28, w/English translation (3 pages).
International Search Report dated Apr. 25, 2017, issued in counterpart application No. PCT/JP2017/012199 (2 pages).

* cited by examiner

×5000 —— 5μm

SKELETON-FORMING AGENT AND NEGATIVE ELECTRODE USING SAME

TECHNICAL FIELD

The present invention relates to a skeleton-forming agent used for formation of the skeleton of an active material layer in a negative electrode of a lithium ion battery, and a negative electrode using the same.

BACKGROUND ART

The field of use of second batteries has expanded from electronic equipment to automobiles, large-scale electric storage systems, etc., and is expected to grow to an industry of a market scale of ten trillion yen or more. Especially, information communication equipment such as smartphones and tablet-type terminals has achieved remarkable proliferation, in which the worldwide penetration rate has exceeded 30%.

In addition, secondary batteries have extended the range of their applications to power supplies for next-generation automobiles such as electric vehicles (EV) and plug-in hybrid vehicles (PHEV), among others. Also, secondary batteries have come into use for home backup power supplies, storage of natural energy, load leveling, etc. since the Great East Japan Earthquake in 2011 as an impetus, and thus the use of secondary batteries is expanding. Thus, secondary batteries have become indispensable also for introduction of energy saving technology and new energy technology.

Conventionally, alkaline secondary batteries such as nickel-cadmium batteries and nickel-hydride batteries have been the mainstream of the secondary batteries. However, use of lithium ion batteries that are nonaqueous electrolyte secondary batteries is increasing due to their features of being small-size, light-weight, and high-voltage, and being free from memory effect. The lithium ion battery is constituted by a positive electrode, a negative electrode, a separator, an electrolytic solution (or an electrolyte), and a battery jar (storage case).

An electrode such as the positive electrode and the negative electrode is constituted by an active material, a conductive auxiliary, an organic polymer binder, and a collector. In general, an electrode is manufactured by mixing an active material, a conductive auxiliary, and an organic binder in a solvent to form slurry, and coating a collector with the slurry, drying the slimy, and then rolling the dried slurry with a roll press, etc.

The binder is used for binding inside the active material, between the active material and the conductive auxiliary, between the active material and the collector, and between the conductive auxiliary and the collector. The binder can be roughly classified into a "solution type" where the binder is dissolved in a solvent to be used as a liquid, a "dispersion (emulsion/latex) type" where a solid binder is dispersed in a solvent and used, and a "reaction type" where a binder derivative is made to react with heat and light and used.

Since an organic solvent-based binder including N-methyl-2-pyrrolidone (NMP) is considered to have a possibility of adversely affecting the environment, it is required to recover the battery once its electrode has dried, and this causes rise of the electrode manufacturing cost. Also, since the organic solvent-based binder swells in a high-temperature electrolytic solution, increasing the electrode resistance, such a binder is hard to use under a high-temperature environment.

A water-based solution-type binder, which is poor in oxidation resistance characteristics or reduction resistance characteristics, is gradually decomposed with repeated charge/discharge in many cases, failing to obtain sufficient life characteristics. Also, having low ion conductivity, this type of binder is poor in output characteristics. The dispersion type binder has an advantage that water can be used as a solvent, but tends to lose the dispersion stability depending on the degree of acidity and alkalinity (pH), the water concentration, or the environment temperature, thereby easily causing segregation, aggregation, precipitation, etc. during mixing the electrode slimy. Also, binder microparticles having dispersed in the water, having a particle diameter of 1 to 800 nm, fuse mutually when the water content is vaporized by drying, forming a film. This film, having neither electric conductivity nor ion conductivity, greatly affects the output characteristics and life characteristics of the battery with only a slight difference in use amount.

When solution-type and dispersion-type binders as described above are combined with an active material that causes a sharp volume change along with the charge/discharge of sulfur (S), silicon (Si), tin (Sn), aluminum (Al), etc., stable life characteristics will not be obtained, and the charge/discharge capacity will be reduced to a half or less in merely several cycles.

The reaction-type binder is excellent in all of the heat resistance, the binding properties, and the chemical resistance. In particular, PI exhibits high heat resistance and binding properties, stable life characteristics can be obtained even with an active material large in volume change, and the binder resists swelling in a high-temperature electrolytic solution.

Non-Patent Literature 1 discloses that, by combining PI and a high-strength collector, degradation of the collector can be prevented, further improving the life characteristics.

Patent Literature 1 discloses that a $LiFePO_4$/SiO-based lithium ion secondary battery using PI for its positive and negative electrodes can be charged/discharged stably even at a high temperature of 120° C. However, when PI, excellent in binding properties with a collector, is combined with an active material large in volume change, creases and cracks may sometimes occur on the collector in the initial charge discharge. It is therefore necessary to use iron foil or stainless foil high in mechanical strength for the collector.

Besides the organic binders described above, a technology using an inorganic binder for an electrode of a secondary battery is disclosed in Patent Literatures 2 to 4 although such examples are hardly reported in the field of lithium ion batteries. Patent Literature 2 proposes an electrode mixture for a nonaqueous electrolyte secondary battery, an electrode, and a nonaqueous electrolyte secondary battery, which includes an amorphous carbon material including an inorganic binder, a conductive agent, a binder, and a solvent and has a viscosity in the range of 2000 mPa·s and 10000 mPa·s. This literature describes that, with inclusion of the inorganic binder, the decomposition reaction of the binder can sometimes be prevented or reduced.

Patent Literature 3 and Patent Literature 4 propose physically and chemically stable lithium ion batteries using an inorganic binder. As described above, an electrode is generally constituted by an active material layer (layer made of an active material, a conductive auxiliary, and a binder) and a collector. In some cases, however, a layer different from the active material layer may be provided on the active material layer.

For example, Patent Literature 5 proposes a nonaqueous secondary battery using an electrode sheet having a layer including metal or a semimetal oxide as a main constituent and at least one auxiliary layer including water-insoluble particles. The literature describes that the auxiliary layer of the electrode sheet, constituted by water-insoluble conductive particles and a binding agent, may Anther include substantially nonconductive particles mixed therein. It describes that, as such substantially nonconductive particles, an oxide including a compound soluble in both acid and alkali is preferable. It also describes that, as the binding agent used in the auxiliary, a binding agent used for formation of an electrode mixture can be used.

As such secondary batteries, batteries having various shapes such as a cylinder type, a square type, and a laminated type have achieved widespread use. The cylinder type is adopted for a battery having a comparatively small capacity from the standpoint of the pressure resistance and easiness of sealing, and the square type is adopted for a battery having a comparatively large capacity from the standpoint of easiness of handling.

Focusing on the electrode structure, the secondary batteries are roughly classified into a stacking type and a winding type. In a battery of the stacking type, positive electrodes and negative electrodes are stacked alternately with a separator therebetween, to form an electrode group, which is housed in a battery case. Many of stacking-type batteries have their square-type battery cases. In a battery of the winding type, a positive electrode and a negative electrode are wound with a separator therebetween into a spiral shape, winch are housed in a battery case. The battery cases of the winding-type batteries may be of the cylinder type or the square type.

CITATION LIST

Patent Literature

Patent Literature 1: JP 5728721
Patent Literature 2: JP 5293020
Patent Literature 3: JP H11-144736A
Patent Literature 4: JP H10-523411A
Patent Literature 5: WO 1996/027910

Non-Patent Literature

Non-Patent Literature 1: Takashi Mukai, et al., Development of lithium ion battery active material and electrode material technology, Science & Technology Co., LTD., pp. 269-311 (2014), ISBN:978-4-86428-089-1
Non-Patent Literature 2: Masahiro Yanagida, et al., The 83rd Electrochemical Society of Japan Lecture Abstracts. 1T28 (2016)

SUMMARY OF INVENTION

Technical Problem

As described above, in Non-Patent Literature 1 and Patent Literature 1, when thin copper foil is used for the collector, creases and cracks may occur, thereby failing to serve as an electrode (see FIG. 19). By contrast, using high-strength iron foil or stainless-steel foil for the collector, the collector may be made resistant to occurrence of creases and cracks even if the collector is thin. However, since such a collector has very high strength and excellent toughness, the process of punching the electrode will find difficulty, in which the active material layer may drop off during cutting and burrs may occur on the cut surface.

Also, since PI is so excellent in chemical resistance that it does not dissolve in almost all organic solvents. Therefore, to produce an electrode slurry, polyamic acid (polyamide acid) that is a PI derivative, etc. may be dissolved in NMP and heat-treated at 200° C. or more to allow imidization reaction (cyclodehydration reaction) to proceed, thereby obtaining PI. After the imidization reaction, heat treatment at a further higher temperature is performed to cause cross-linking reaction, to obtain PI with high mechanical strength. From the standpoint of the electrode life, the heat treatment is preferably performed at a temperature as high as possible as long as PI is kept from carbonizing. However, the heat treatment at 200° C. or more not only reduces the flexibility of the electrode, making the handling difficult, but also inevitably oxidizes the active material and the surface of the collector, becoming a cause of irreversible capacity. The heat treatment at a high temperature also causes a rise in power consumption during the manufacture of the electrode.

There is also a PI binder in which PI obtained by the imidization is dispersed in a solvent. Using a previously imidized binder at the addition to the slurry, however, the resultant electrode is poor in adhesion strength, and poor in life characteristics. Also, most of reaction-type binders including the PI binder occlude alkali metal ions during initial charge, but fail to take out during discharge, becoming a cause of irreversible capacity. For example, although depending on the molecular structure, PI has an irreversible capacity as large as 500 to 1000 mAh/g. Therefore, an electrode using a reaction-type binder will be low in initial charge/discharge efficiency, resulting in great decrease in battery capacity.

Incidentally, to confirm the safety of a battery, a nail penetration test is performed. When a nail is allowed to penetrate a full-charge battery, heat generation exceeding 600° C. is sometimes observed in the battery even if the battery is of a class of 1 Ah nominal capacity. According to Non-Patent Literature 1, in a battery using an Si-based active material, the nail penetration safety of the battery is greatly improved.

Non-Patent Literature 2 examined the above phenomenon and shows the results that, when the electron conductivity of the active material layer of an electrode is high, the heat generation temperatures of the battery and the nail during nail penetration become high, and, when the election conductivity of the active material layer is low, the heat generation temperatures of the battery and the nail during nail penetration become low. That is, the electron conductivity of the electrode active material layer greatly contributes to the nail penetration safety of the battery. When the electron conductivity of the active material layer is high, the value of the current flowing through the nail becomes large, increasing the heating values of the nail and the battery. When the electron conductivity is low, the value of the current flowing through the nail becomes small, decreasing the heating values per unit time.

An alloy-based active material improves the electron conductivity when alloyed with alkali metal. For example, while Si in the discharged state is a semiconductor and is low in electron conductivity, an $Li_xSi$ alloy ($0<x \leq 4.4$) in the charged state is a conductor and is high in election conductivity. That is, in an Si-based negative electrode, it is considered that, by internal short-circuiting, an Si-based active material in a short-circuited portion is delithiated, sharply reducing the electron conductivity of the electrode and shutting off the current, whereby the temperature of the battery can be kept from rising.

However, the electron conductivity of the active material layer increases for an electrode having a large amount of the conductive auxiliary in the active material layer and for au electrode using a material in which the active material is coated with or combined with a highly conductive material. Even using an Si-based material, it will be difficult for the current shut-off mechanism as described above to function, failing to sufficiently keep the temperature of the battery from rising. For this reason, to design a battery putting importance on safety, it has been necessary to use an electrode having a low-conductive active material layer. Conversely speaking, with an electrode composition putting importance on safety, winch is low in electron conductivity, a battery with low power will be produced with high possibility.

Even a battery using an electrode including an active material layer with low electron conductivity cannot eliminate momentary heat generation during internal short-circuiting. Therefore, when the binder carbonizes with this heat generation, the electron conductivity of the electrode will increase, thereby losing the safety. Even for an organic reaction-type binder excellent in heat resistance, the allowable temperature limit is of the order of 400° C. If the temperature rise by internal short-circuiting exceeds the allowable temperature limit, the binder will carbonize. A binder free from carbonizing is therefore required.

In an active material, it is known that a material small in volume change generally exhibits good life characteristics. For example, the charging reaction of Si (Si+4.4Li$^+$+4.4e$^-$ →Li$_{4.4}$Si) produces about 4-fold volume change, and the charging reaction of SiO (SiO+8.4Li$^+$+8.4e$^-$→Li$_{4.4}$Si+ Li$_4$SiO$_4$) produces about 2.7-fold volume change excluding the volume change for initial generation of Li$_4$SiO$_4$. Therefore, SiO exhibits excellent life characteristics compared to Si.

As another example, for a negative electrode using Si mixed with alumina, the capacity decreases as the Si ratio decreases, compared to a pure Si negative electrode, but the life characteristics tend to be improved. Alumina, which does not react with Li, does not contribute to the charge/discharge reaction, but serves as a buffer against the Si volume change and can reduce the volume change of the entire electrode.

For example, the charging reaction of the Si negative electrode, represented by Formula (1) below, causes about 4-fold volume change compared to before charging, and exerts about 4-fold stress on the electrode binder.

$$Si+4.4Li^++4.4e^-\rightarrow Li_{4.4}Si \qquad (1)$$

A negative electrode including Si and Al$_2$O$_3$ in an equimolar amount, where Al$_2$O$_3$ does not react with Li, causes charging reaction as represented by formula (2) from a macroscopic viewpoint. In such an electrode, the volume change of the electrode is halved compared to a pure Si electrode, and thus the stress exerted on the electrode binder is also halved. Therefore, it is expected that an electrode including Si mixed with a material smaller in volume change than Si may decrease in capacity as the Si ratio decreases, but tends be improved in life characteristics.

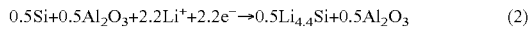

$$0.5Si+0.5Al_2O_3+2.2Li^++2.2e^-\rightarrow 0.5Li_{4.4}Si+0.5Al_2O_3 \qquad (2)$$

In the actual life characteristics, however, the result is that, while a slight life improving effect is recognized, the Si degradation rate in each cycle does not change so much. The reason is that, from a microscopic viewpoint, since the volume change of Si particles themselves is about 4-fold, the stress exerted on the electrode binder does not change from Formula (1), and as a result the stress is concentrated on the binding portion. In particular, for an electrode in which spot adhesion with a binder has been made inside the electrode material and between the electrode material and the collector, the adhesion portion may collectively undergo stress caused by volume change, whereby the binding properties are lost, easily destroying the conductive network of the electrode.

When the binder is for face adhesion, the binding portion disperses the stress uniformly. Therefore, the conductive network is less easily destroyed, but the binder blocks the migration of ions, reducing the output characteristics. Although depending on the kind of the binder, spot adhesion tends to occur when the amount of the binder is small, and face adhesion tends to occur when the amount of the binder is large.

Presently, among many binders, binders permitting stable charge/discharge of the alloy-based active material are limited to reaction-type binders such as PI. The reaction-type binders however use an organic solvent during production of slurry and require a heat treatment process at 200° C. or more. The resultant electrode has a large binder-derived irreversible capacity and has limits for its safety.

Also, it is difficult to exert sufficient life characteristics with only a reaction-type binder, and necessary to combine the binder with SiO, high-strength collector foil, etc. It is known that, while an organic substance is low in melting point, easily dissolves in an organic solvent, and is flammable, an inorganic substance is high in melting point, does not easily dissolve in an organic solvent, is nonflammable, and is high in thermal conductivity. Therefore, if a binder constituted by an inorganic substance can be used, there is a high possibility that an electrode excellent in electrolyte resistance and heat dissipation can be obtained.

Conventionally, however, many inorganic binders have not been adapted to the use for nonaqueous electrolyte secondary batteries. The inorganic binders can be roughly classified into four kinds, i.e., a silicate base, a phosphate base, a sol base, and a cement base. Among others, the present inventors have focused attention on the silicate base and the phosphate base, particularly on an alkali metal silicate base, that exhibit strong binding properties to all of metal, oxides, and carbon and have heat resistance against 1000° C. or more.

The silicate base may include, in addition to the alkali metal silicate, a silicate of a guanidine compound and a silicate of an ammonium compound. A silicate-based inorganic binder is a compound including silicon (Si) and oxygen (O) having a siloxane bond (—Si—O—Si—) as a main molecular skeleton, which is different from an organic binder having a skeleton including carbon as a main constituent (see FIG. 21a).

Part of the Si sites in the siloxane bond may be substituted by a transition metal element such as Al, Zr, Ti, Mg, Mo, Sr, Ca, Zn, Ba, B, W, Ta, Ce, Hf, and Y.

The silicates include many kinds including polysilicates such as orthosilicate (A$_4$SiO$_4$), metasilicate (A$_2$SiO$_3$), pyrosilicate (A$_6$Si$_2$O$_7$), disilicate (A$_2$Si$_2$O$_5$), and tetrasilicate (A$_2$Si$_4$O$_9$), A$_2$Si$_2$O$_5$, A$_2$Si$_3$O$_7$, and A$_2$Si$_4$O$_9$, which may also be hydrates. The structures of these silicates can be roughly classified into crystalline silicates and amorphous silicates (A: an alkali metal element, a guanidine compound, or an ammonium compound). Such a silicate tends to be lower in melting point as the proportion of A in the silicate increases, and simultaneously will exhibit solubility in water.

Industrially speaking, the proportion of A in the silicate can be changed continuously, permitting preparation of arbitrary salt, where the general molecular formula of the silicate is represented by $A_2O.nSiO_2$.

With the difference in molecular skeleton, the silicates exhibit higher heat resistance and oxidation resistance than the organic binders, and are applied to various fields such as a fireproofing agent, a waterproof agent, a bleach, a detergent, soap, a coating agent, a sealing agent, and a ground reinforcing agent. However, little applications have been reported in the field of nonaqueous electrolyte secondary batteries.

The phosphate base may include, in addition to aluminum phosphates, magnesium phosphates and calcium phosphates.

In the phosphate-based inorganic binder, water is removed from the hydroxyl group by heating and covalent bonding occurs between phosphorous and oxygen, causing dehydration condensation reaction. The dehydration condensation reaction is allowed to occur at six positions at maximum for one molecule including a transition metal (M) as the center, whereby a three-dimensionally polymerized transition metal phosphate is obtained. That is, this is a compound including phosphorus (P) and oxygen (O) having an aluminophosphate bond and a transition metal (M) as a main molecular skeleton, which is different from an organic binder having a skeleton including carbon as a main constituent (see FIG. 21b).

Part of the transition metal sites may be substituted by a transition metal element such as Al, Mg, Ca, Cu, Fe, Ba, Ti, Mn, Mo, Si, Sr, Ca, Zn, Ba, B, W, Ta, Ce, Hf, and Y.

Specifically, the aluminum phosphates include aluminum primary phosphate ($Al(H_2PO_4)_3$), aluminum hydrogenphosphate ($Al_2(H_2PO_4)_3$), and aluminum metaphosphate ($Al(PO_3)_3$). The magnesium phosphates include magnesium primary phosphate ($Mg(H_2PO_4)_3$), magnesium hydrogenphosphate ($MgHPO_4$), and magnesium metaphosphate ($Mg(PO_3)_2$). The calcium phosphates include calcium primary phosphate ($Ca(H_2PO_4)_3$), calcium hydrogenphosphate ($CaHPO_4$), tricalcium phosphate ($Ca_3(H_2PO_4)_2$), and calcium metaphosphate ($Ca(PO_3)_2$). These may also be hydrates. The structures of these phosphates can be roughly classified into crystalline phosphates and amorphous phosphates.

Industrially speaking, the proportions of M and P in the phosphate can be changed continuously, permitting preparation of arbitrary salt, where the general molecular formula of the phosphate is represented by $M.nH_xPO_4$ (M=Al, Mg, or Ca).

The sol base is a colloidal solution where oxide microparticles are dispersed in water. The particle diameter of the oxide is greater than or equal to 10 nm and less than or equal to 200 nm, and a hydroxyl group is present on the surface of the particle. For example, when the oxide is $SiO_2$, a siloxane bond is formed by dehydration condensation. Since the siloxane bond is formed inside particles of the oxide, the sol base is weak in bonding force compared to the silicate base. It also has a problem that pH management is important, and the sol stale is hard to maintain stably. According to the present invention, since the sol base resists permeating into the active material layer, use of the sol vase as the skeleton-forming agent is not preferable.

Patent Literature 2 describes that, with inclusion of an inorganic binder in the binder, the decomposition reaction of the binder can sometimes be prevented or reduced. This is considered because, since a carbon material (such as graphite, soft carbon, and hard carbon) has a charge/discharge plateau potential at and around 0.1 V (vs. $Li^+/Li$), imparting the electrode strong reduction power, the decomposition reaction is prevented or reduced with the inorganic binder excellent in reduction resistance.

However, the alloy-based material has a charge/discharge plateau potential higher than the carbon material and is weaker in reduction power than the carbon-based electrode, and thus does not so much cause the decomposition reaction of the binder. Therefore, even if the decomposition reaction of the binder is prevented or reduced, the life characteristics of the alloy-based electrode will not be largely improved.

Also, Patent Literature 2 describes that the inorganic binder includes inorganic particles, and the particle diameter of the inorganic particles is preferably greater than or equal to 1 nm and less than or equal to 100 nm, more preferably greater than or equal to 1 nm and less than or equal to 50 nm, further more preferably greater than or equal to 1 nm and less than or equal to 10 nm. It is described that, with such a particle diameter, a binder excellent in both the dispersibility of the electrode mixture and adhesion force can be obtained.

Inorganic particles are large in specific gravity compared to the carbon material. Therefore, as the particle diameter of the inorganic particles is greater, the rate of precipitation of the particles increases, decreasing the dispersibility and the adhesion force. Therefore, use of 100 nm or less particles is effective. However, there is a problem that, during drying after electrode coating, 100 nm or less particles block the escape route of vaporized water, resulting in foaming of the coat, whereby the binding properties with the collector may degrade and a uniform electrode will not be easily obtained. Also, since such an electrode does not include an organic binder excellent in flexibility, it is brittle and will break when bended. Such an electrode is not suitable for the winding-type battery.

On the other hand, the alloy-based active material is known to be higher in capacity than the conventional carbon-based active material. Therefore, a little error wilt cause great variations in electrode capacity, worsening the life characteristics and the output characteristics in some cases. Also, since the viscosity of the electrode slurry dramatically changes with the use amount of the solvent, control thereof is difficult.

Patent Literature 3 and Patent Literature 4 present physically and chemically stable lithium ion batteries using an inorganic binder. As an electrode example, a graphite negative electrode (graphite anode) and a $LiCoO_2$ positive electrode ($LiCoO_2$ cathode) are described. The graphite negative electrode is constituted by 1.0 g of lithium hydroxide, 23.4 g of an inorganic binder (lithium polysilicate), and 45.0 g of graphite powder.

All of Patent Literatures 2 to 4 cited above intend to improve the decomposition reaction of the binder and the swelling in the electrolytic solution, which have been difficult to solve with the conventional organic binders. By using an Si-based or Sn-based alloy material as the active material and a binder that resists swelling in the electrolytic solution, it seems possible to extend the use temperature of the electrode and achieve high capacity.

However, since the silicate-based binder is strongly alkaline and the phosphate-based binder is strongly acid, an alloy-based active material dissolves during production of the electrode slurry, generating hydrogen gas to foam the slurry. In particular, since the temperature goes high during drying of the electrode, the generation amount of the hydrogen gas increases, which makes even manufacture of uniform electrodes difficult. Also, use of a collector vulnerable to alkali and acid will degrade the collector.

For example, when an Si active material and an alkali metal silicate come into contact with each other, reaction of Si+2OH$^-$+H$_2$O→SiO$_3$$^{2-}$+2H$_2$↑ occurs. Therefore, under the present circumstances, the only choice is an alkali-resistant or acid-resistant active material, i.e., a carbon-based material. Also, the binder as one of the constituents of the electrode is used for binding inside the active material, between the active material and the conductive auxiliary, between the active material and the collector, and between the conductive auxiliary and the collector. However, the current batteries use organic binders such as PVdF and SBR, and such binders are small in thermal conductivity compared to inorganic materials of the active material, the conductive auxiliary, and the collector, resisting conducting heat.

Also, since a silicate-based or phosphate-based inorganic binder is great in specific gravity compared to the conventional organic binders, sufficient bonding force will not be exerted unless the amount of the binder used daring production of the electrode is 20 mass % or more with respect to the total amount of the solid content including the active material, the conductive auxiliary, and the binder being 100 mass %. In particular, when a material large in volume change is used, 30 to 70 mass % will be necessary. This reduces the proportion of the active material in the electrode, thereby reducing the electrode energy density.

As described above, the present inventors have initially examined, over and over again, application of silicate-based and phosphate-based binders, and found that many problems arise under the present circumstances when a silicate and a phosphate are applied as the binder, so that the resultant electrode will not stand as a practical electrode. Given this situation, the present inventors have conducted studies upon studies so that a silicate and a phosphate can be applied to the electrode, not as the binder, and have achieved the present invention. The present invention can solve, not only the conventional problems described above, but also problems newly found by the present inventors.

Solution to Problem

The skeleton-forming agent according to the present invention is a skeleton-forming agent used for skeleton formation of an active material layer of a negative electrode for a lithium ion battery, the negative electrode including an Si-based material as an active material, wherein the skeleton-forming agent includes a silicate having a siloxane bond or a phosphate having an aluminophosphate bond as an ingredient. With this configuration, by using such a skeleton-forming agent including a silicate or a phosphate for a negative electrode for a lithium ion battery, it is possible to provide a negative electrode having excellent heat resistance, high strength, and improved cycle life characteristics.

The negative electrode according to the present invention is a negative electrode for a lithium ion battery, wherein the skeleton-forming agent including a silicate having a siloxane bond or a phosphate having an aluminophosphate bond as an ingredient is present at least on the surface of the active material layer. With tins configuration, the skeleton-forming agent including a silicate or a phosphate constitutes the skeleton of the negative electrode, and thus the negative electrode has excellent heat resistance, high strength, and improved cycle life characteristics. Also, although use of a binder including a silicate or a phosphate fails to provide a practical negative electrode, a negative electrode excellent in cycle life characteristics can be obtained by applying the skeleton-forming agent to the surface of the active material layer.

In this negative electrode, the skeleton-forming agent is present in the active material layer, and in the active material layer gaps are present inside the active material. With this configuration, by coating the negative electrode with the skeleton-forming agent, the skeleton-forming agent permeates into the active material layer. Also, gaps inside the active material are not completely filled with the skeleton-forming agent in the active material layer, but gaps remain unfilled. Tins allows expansion/contraction of the active material during charge/discharge, and prevents or reduces occurrence of creases and cracks on the collector of the negative electrode.

The silicate of this skeleton-forming agent has a crystalline or amorphous structure represented by general formula A$_2$O.nSiO$_2$ where A is at least one kind selected from Li, Na, K, a triethanol ammonium group, a tetramethanol ammonium group, a tetraethanol ammonium group, and a guanidine group, and n is greater than or equal to 1.6 and less than or equal to 3.9, more preferably greater than or equal to 2.0 and less than or equal to 3.5. A is preferably Na from the standpoint of being excellent in the mechanical strength and binding properties for skeleton formation and wear resistance. Note that using Li, a skeleton-forming body high in ion conductivity is obtained, and thus the resultant battery is excellent in input/output characteristics.

Even when Na is used, if the number n of SiO$_2$ exceeds 5.0, the resultant skeleton-forming agent is poor in binding properties with the active material layer and the separator, and tends to significantly cause peeling and cracking due to external causes such as a volume change of the electrode during charge/discharge and a nail penetration test. Also, the viscosity becomes so low that the dispersion stability with ceramic to be described later degrades. By contrast, if n is less than 0.5, the viscosity is so high that the skeleton-forming agent becomes resistant to permeating into or being applied to the electrode active material layer and the separator. Also, the heating value becomes large at the time of kneading with the ceramic. For these reasons, n is preferably greater than or equal to 1.6 and less than or equal to 3.9, more preferably greater than or equal to 2.0 and less than or equal to 3.5.

The silicate is preferably amorphous. An amorphous silicate is free from breaking in a specific direction like a crystal, and thus the life characteristics of the electrode are improved. In addition, since the resistance against hydrofluoric acid improves, hydrofluoric acid-caused electrode collapse can be made to hardly occur. The silicate is more preferably an amorphous solid exhibiting a glass transition phenomenon with temperature rise.

Normally, an amorphous solid is made of a disorderly molecular sequence, having no distinguishable crystal lattice. Also, the solubility of the amorphous solid is higher than that of a crystalline form and does not have a fixed melting point. Therefore, being an amorphous form is determined by the absence of a definite peak in a powder X-ray diffraction (XRD) pattern and the absence of a melting endothermic peak in a differential thermal analysis (DTA) curve and a differential scanning calorimetry (DSC) curve.

That is, an amorphous silicate has no sharp peak that is a feature of the crystalline form in XRD and exhibits a broad peak typical for a diffraction angle (2θ) in the range of 15° to 40° by Cu—Kα ray, i.e., a so-called halo pattern. More specifically, an XRD pattern substantially identical to that in FIG. 17 is exhibited.

All of those that can obtain a halo pattern by XRD are not necessarily amorphous. This is however in the limited condition that the size of crystal grains is less than 5 nm in the Scherrer equation represented by Formula (3). That is, when the size of crystal grains is 5 nm or more, the diffraction line is wide, not forming a pattern similar to the amorphous one.

$$D(\text{Å}) = 0.9\lambda/(\beta \times \cos\theta) \quad (3)$$

(where D is the size of crystal grains, λ is the wavelength of an X-ray tube, β is the expanse of the diffraction line depending on the size of crystal grains, and θ is the diffraction angle).

A change from an amorphous state to a crystalline state causes large heat generation. By measuring this heat generation, therefore, the crystalline state of the silicate can be determined. An amorphous silicate can be obtained by heat-treating the electrode at a temperature greater than or equal to 80° C. and less than or equal to 600° C. at a temperature rise rate of 10° C./h or more.

Preferably, the solid content concentration of the silicate of the skeleton-forming agent is greater than or equal to 0.1 mass % and less than or equal to 30 mass % or less, more preferably greater than or equal to 0.1 mass % and less than or equal to 15 mass %.

The skeleton-forming agent may further include a surfactant in an amount greater than or equal to 0.001 mass % and less than or equal to 5.0 mass %. This improves the lyophilicity of the skeleton-forming agent to the active material layer, allowing the skeleton-forming agent to permeate into the active material layer uniformly. Thus, a uniform skeleton is formed in the active material layer, further improving the cycle life characteristics. If the amount of the surfactant is less than 0.001 mass %, the skeleton-forming agent will become resistant to permeating into the active material layer that includes a large amount of carbon-based materials such as graphite, hard carbon, and the conductive auxiliary. If it exceeds 5 mass %, a detbaming agent will be necessary. Without a deforming agent, the surface of the active material layer will foam, making it difficult to form a robust skeleton.

This negative electrode has a layer including alkali-resistant inorganic particles on the active material layer. With this configuration, when the negative electrode is coated with the skeleton-forming agent, the inorganic particles stack on the upper surface of the active material layer of the negative electrode, covering the active material layer with the layer of inorganic particles. Having this configuration, a robust skeleton can be formed with the layer of inorganic particles, and also peeling and cracking during drying can be kept from occurring. Also, the layer of inorganic particles serves as the separator, making it possible to constitute a battery without use of a separator separately. Note that, when the skeleton-forming agent is phosphate-based, a layer including acid-resistant inorganic particles will be formed.

In this negative electrode, inorganic particles may enter the inside of the active material layer, whereby a robust skeleton can be formed in the active material layer, and occurrence of peeling and cracking during drying can be prevented or reduced. Also, holes are formed from gaps between the inorganic particles, imparting good lyophilicity with the electrolytic solution. Further, with the layer of inorganic particles, a negative electrode having excellent heat resistance, high strength, and excellent wear resistance will be obtained.

With the alkali-resistant inorganic particles included in the skeleton-forming agent applied to the negative electrode, the skeleton-forming agent becomes resistant to foaming when dried at a high temperature. Foaming of the skeleton-forming agent will reduce the binding properties with the active material layer and the separator, making it difficult to obtain sufficient strength.

Preferably, in this skeleton-forming agent, the content of the silicate is greater than or equal to 5 mass % and less than or equal to 80 mass %, and the content of the alkali-resistant iuorgaiuc particles is greater than or equal to 20 mass % and less than or equal to 95 mass %, with respect to the total amount of tike solid content including the silicate and the alkali-resistant iuorgaiuc particles being 100 mass %.

In this negative electrode, the median diameter ($D_{50}$) of the alkali-resistant inorganic particles is preferably greater than or equal to 0.2 μm and less than or equal to 20 μm. The medial diameter ($D_{50}$) means the volume reference particle diameter in the laser diffraction scattering particle diameter distribution measurement. The laser diffraction/scattering particle diameter distribution measurement is a method of measuring the size of a particle using the phenomenon that the light intensity distribution of diffracted/scattered light differs with the particle size when the particle is irradiated with laser light.

The reason why the median diameter ($D_{50}$) of the alkali-resistant inorganic particles is set to greater than or equal to 0.2 μm and less than or equal to 20 μm is that holes are formed from gaps between inorganic particles, imparting good lyophilicity with the electrolytic solution. From the standpoint of the output characteristics of the battery, the median diameter is more preferably greater than or equal to 0.25 μm and less than or equal to 10 μm, further preferably greater than or equal to 0.3 μm and less than or equal to 2 μm.

If the particle diameter of the inorganic particles is greater than the above range, the thixotropy will decrease, tending to exhibit dilatancy, whereby the dispersion stability exhibited when the inorganic particles are added to the skeleton-forming agent will decrease. By contrast, if the particle diameter is less than the above range, there will be no escape route for vaporized water during drying in the case of forming a skeleton having a thickness exceeding 2 μm, causing the coat to foam, whereby not only the binding properties with the collector may degrade, but also a uniform electrode will not be easily obtained.

The reason why the inorganic particles need to be alkali-resistant is that the silicate is strongly alkaline (pH 12 or more). In addition to the alkali resistance described above, the inorganic particles of the skeleton-forming agent are desirably excellent in resistance to dissolving in the electrolytic solution.

Examples of the inorganic particles satisfying the above conditions include an oxide, a hydroxide, a nitride, a carbide, a carbonate compound, and a sulfate compound of at least one element selected from the group consisting of Al, Zr, Ti, Si, Mg, Mo, Sr, Ca, Zn, Ba, B, W, Ta, Ce, Hf, and Y. Among others, from the standpoint of being materials resistant to oxidative decomposition and reductive decomposition during charge/discharge of the battery and small in irreversible capacity, it is preferable to include $Al_2O_3$, $ZrO_2$, $TiO_2$, $SiO_2$, CaO, MgO, CeO, $Y_2O_3$, AlN, WC, SiC, $B_4C$, BN, TaC, TiC, $TiB_2$, $HfB_2$, $Si_3N_4$, TiN, $CaCO_3$, $MgSO_4$, $Al_2(SO_4)_3$, $CaSO_4$, and $ZrSiO_4$.

In addition, from the standpoint of being materials small in the irreversible capacity of the battery, it is preferable to include $Al_2O_3$, $ZrO_2$, $TiO_2$, $SiO_2$, MgO, CeO, $Y_2O_3$, WC, SiC, $B_4C$, TaC, TiC, $Si_3N_4$, TiN, $CaCO_3$, $MgSO_4$, $CaSO_4$, and $ZrSiO_4$. Using these materials, it is possible to obtain the effect of preventing or reducing the large volume contraction of the silicate occurring during drying and have sufficient strength even with low-temperature diving.

On the other hand, the phosphate has a crystalline or amorphous structure represented by general formula $M \cdot nH_xPO_4$ where M is at least one kind selected from Al, Ca, and Mg, x is greater than or equal to 0 and less than or equal to 2, and n is greater than or equal to 0.5 and less than or equal to 5.

M is preferably Al from the standpoint of being excellent in the mechanical strength and binding properties for skeleton formation and wear resistance; x is preferably 1 to 2, more preferably 2, from the standpoint of being excellent in binding properties for skeleton formation; and n is preferably 0.5 to 5.0, more preferably 2.5 to 3.5, from the standpoint of being excellent in the mechanical strength and binding properties for skeleton formation and wear resistance. Like the silicate, the phosphate is preferably amorphous, more preferably an amorphous solid exhibiting the glass transition phenomenon by temperature rise.

Preferably, the solid content concentration of the phosphate of this skeleton-forming agent is greater than or equal to 0.1 mass % and less than or equal to 30 mass %, more preferably greater than or equal to 0.1 mass % and less than or equal to 15 mass %.

This skeleton-forming agent may also include a surfactant in an amount greater than or equal to 0.001 mass % and less than or equal to 5.0 mass %.

This skeleton-forming agent may further include acid-resistant inorganic particles. With this configuration, when the electrode is coated with the skeleton-forming agent, the inorganic particles stack on the surface of the active material layer of the electrode, covering the active material layer with the layer of inorganic particles. Also, the inorganic particles enter the inside of the active material layer.

With the above configuration, a robust skeleton can be formed in the active material layer, and occurrence of peeling and cracking during drying can be prevented or reduced. Also, holes are formed from gaps between the inorganic particles, imparting good lyophilicity with the electrolytic solution. Further, with the layer of inorganic particles, an electrode having excellent heat resistance, high strength, and excellent wear resistance will be obtained. Moreover, the layer of inorganic particles serves as the separator, making it possible to constitute a battery without use of a separator separately.

In this skeleton-forming agent, the content of the phosphate may be greater than or equal to 5 mass % and less than or equal to 80 mass %, and the content of the acid-resistant inorganic particles may be greater than or equal to 20 mass % and less than or equal to 95 mass %, with respect to the total amount of the solid content including the phosphate and the acid-resistant inorganic particles being 100 mass %. Also, the median diameter ($D_{50}$) of the acid-resistant inorganic particles may be greater than or equal to 0.2 μm and less than or equal to 20 μm.

With the acid-resistant inorganic particles included in the skeleton-forming agent, the skeleton-forming agent becomes resistant to foaming when dried at a high temperature. Foaming of the skeleton-forming agent will reduce the binding properties with the active material layer and the separator, making it difficult to obtain sufficient strength. The median diameter ($D_{50}$) of the acid-resistant inorganic particles is preferably greater than or equal to 0.2 μm and less than or equal to 20 μm.

The reason why the inorganic particles need to be acid-resistant is that the phosphate is strongly acid (pH 1 to 2). In addition to the acid resistance described above, the inorganic particles of the skeleton-forming agent are desirably excellent in resistance to dissolving in the electrolytic solution.

Examples of the inorganic particles satisfying the above conditions include an oxide, a hydroxide, a nitride, a carbide, a carbonate compound, and a sulfate compound of at least one element selected from the group consisting of Al, Zr, Ti, Si, Mo, Sr, Ba, B, W, Ta, Ce, Hf, and Y. Among others, from the standpoint of being materials resistant to oxidative decomposition and reductive decomposition during charge/discharge of the battery and small in irreversible capacity, it is preferable to include $Al_2O_3$, $ZrO_2$, $TiO_2$, $SiO_2$, CeO, $Y_2O_3$, WC, SiC, $B_4C$, BN, TaC, TiC, $TiB_2$, $HfB_2$, $Si_3N_4$, TiN, and $ZrSiO_4$.

In addition, from the standpoint of being materials small in the irreversible capacity of the battery, it is preferable to include $Al_2O_3$, $ZrO_2$, $TiO_2$, $SiO_2$, CeO, $Y_2O_3$, WC, SiC, $B_4C$, BN, TaC, TiC, $Si_3N_4$, TiN, and $ZrSiO_4$. Using these materials, it is possible to obtain the effect of preventing or reducing the large volume contraction of the phosphate occurring during drying and have sufficient strength even with low-temperature drying.

Out of the silicate and the phosphate, the silicate is preferable from the standpoint of the battery life, the input/output characteristics, the irreversible capacity, the hygroscopicity resistance, and the heat resistance.

In this negative electrode, preferably, the Si-based material has a median diameter ($D_{50}$) greater than or equal to 0.1 μm and less than or equal to 10 μm, and the oxygen content included in the Si-based material is 0.5 to 30 mass %.

As the active material used for the negative electrode, materials, other than the Si-based material, capable of irreversibly occluding/releasing lithium ions can also be used. However, as a result of examinations of various materials, it was the Si-based material that exerted an outstanding effect of life improvement. Accordingly, the present invention has a feature of including the Si-based material for the active material. Also, the Si-based material may be coated with a material excellent in electron conductivity or ceramic. Note that two or more kinds of materials may be used including the Si-based material and a material other than the Si-based material capable of irreversibly occluding/releasing lithium.

In this negative electrode, the Si-based material has any shape out of a facet shape, a belt shape, a fiber shape, a needle shape, a flake shape, and a donut shape, and further includes a work-affected layer. Note that the Si-based material is a material capable of irreversibly occluding/releasing lithium, i.e., capable of forming an alloy with lithium, and indicates, for example, Si, an Si compound, an Si solid solution, or an Si alloy. More specifically, it refers to Si, an Si-transition metal alloy, or an Si oxide ($SiO_x$; $0<x<2$). Therefore, materials failing to irreversibly occlude/release lithium, e.g., SiC and $SiO_2$, are not included in the Si-based material as defined in this specification.

Examples of the Si-transition metal alloy include a complete solid solubility type alloy, a eutectic alloy, a hypoeutectic alloy, a hypereutectic alloy, and a peritectic alloy.

The active material particles may have a spherical shape, an oval shape, a facet shape, a belt shape, a fiber shape, a needle shape, a flake shape, a donut shape, or a hollow shape, but preferably have a facet shape, a belt shape, a fiber shape, a needle shape, or a flake shape. With the presence of the active material particles having any of the above shapes, the active material particles are entangled with one another, brought into surface contact, and also an anchoring effect occurs between the active material particles, whereby an electrode resistant to collapse of the conductive network can be obtained.

In particular, since active material particles having a facet shape, a belt shape, a fiber shape, a needle shape, a flake shape, or a donut shape are bulky compared to those having a spherical shape or an oval shape, space is produced between the active material particles. With the presence of such space in the active material layer, permeation of the skeleton-forming agent is prompted by the capillary phenomenon, permitting formation of a skeleton-forming body excellent in uniformity. For a similar reason, permeation of the electrolytic solution is also promoted, improving the ion conductivity of the negative electrode material. Also, since the space serves as room for lessening the volume change occurring along with occlusion/release of Li, excellent cycle life characteristics are obtained.

The electrode including the Si-based material refers, for example, to an electrode including Si and graphite, an electrode including Si and hard carbon, an electrode including Si and $SiO_2$, and an electrode including SiO and hard carbon. The Si-based material is preferably included in an amount greater than or equal to 5 mass %, more preferably greater than or equal to 20 mass %, further preferably greater than or equal to 50 mass %, desirably greater than or equal to 70 mass %, with respect to the weight of the entire active material layer (total amount of the active material, the conductive auxiliary, and the binder) being 100 mass %. The reason for this is not certain at present, but the cycle life characteristics tend to improve as the content of the Si-based material increases. Also, with increase of the content of the Si-based material, the electrode energy density improves.

From the standpoint of the stability in the air and the cycle life characteristics of the battery, the oxygen content included in the Si-based material is preferably greater than or equal to 0.5 mass % ($SiO_x$, $x \leq 0.01$). Note however that if the oxygen content in the Si-based material exceeds 30 mass % ($SiO_x$, $x<0.75$), the irreversible capacity will become so great that the energy density of the battery will decrease unless the negative electrode is Li-doped. Therefore, the oxygen content in the Si-based material is preferably greater than or equal to 0.5 mass % and less than or equal to 30 mass % ($SiO_x$, $0.01 \leq x \leq 0.75$), more preferably 0.5 to 25 mass % ($SiO_x$, $0.01 \leq x \leq 0.59$). Considering the irreversible capacity, the active material stability, and the cycle life of the battery comprehensively, the oxygen content is preferably 0.5 to 10 mass % ($SiO_x$, $0.01 \leq x \leq 0.2$).

As used herein, the oxygen content refers to the amount of oxygen bonding with the Si-based material. For example, the oxygen content of SiO is 36.3 mass %, and the oxygen content of $SiO_2$ is 53.3 mass %. Further, this Si-based material is preferably Si having a work-affected layer. The Si-based material having a work-affected layer is small in stress exerted at initial charge/discharge compared to a crystalline Si-based material, whereby pulverization of the active material can be prevented or reduced.

The work-affected layer refers to a layer different in nature generated on the surface of the active material by machining. This layer is a layer formed by alteration of the active material surface by mechanical energy, thermal energy, or composite energy thereof, and a layer having experienced occurrence of disturbance and increase of lattice defects, deformation of crystal grains, micronization, surface flow, phase transformation, tissue change, cracking, etc. For example, in comparison between Si including a work-affected layer (Si powder obtained by shaving an Si ingot: shaving type) and crystalline Si (Si power obtained by crushing an Si ingot: crushing type) by XRD patterns, while Si-derived sharp peaks and broad peaks are observed in mixture in the Si including a work-affected layer, only Si-derived sharp peaks are observed in the crystalline Si.

Such a work-affected layer, which has generated residual distortion, causes residual stress, storing energy therein in the form of potential energy. Therefore, the work-affected layer portion is high in energy level compared to the original material (crystalline Si), and has been activated. With the electrode material having such a work-affected layer, therefore, the stress exerted on the electrode at initial charge/discharge is small, whereby pulverization of the active material can be prevented or reduced, and thus a longer life of the battery can be expected.

Note that the active material having a work-affected layer can be manufactured by machining. For example, it can be manufactured by a process such as cutting, shaving, polishing, grinding, rubbing, and abrading. More specifically, machining may be made using a grindstone, a saw blade, a wire saw, a laser, gas, plasma, a cutter, a milling cutter, a bite, an end mill, a lap, a lathe, spark discharge, etc.

Both a structural defect and micronization occur in an ingot of the active material, even though the ingot is monocrystalline and free from defects, by heat generation and physical force occurring by a process such as cutting, shaving, polishing, grinding, rubbing, and abrading, and further cause lattice fluctuation, whereby a work-affected layer is produced. Powder obtained in this way may contain an impurity (e.g., carbon, a carbon compound, and transition metal) generated in the machining process, but no substantial degradation in characteristics is observed as the negative electrode material for the lithium ion battery.

Among others, from the standpoint that active material particles having a median diameter ($D_{50}$) of primary particles in the range of 0.1 to 10 μm are easy to obtain, it is preferable to manufacture using a grindstone, a saw blade, or a cutter. Also, Si obtainable by reducing a silicon tetrachloride ($SiCl_4$) liquid with zinc gas in a high temperature may be used.

As the particle diameter of the Si-based material, use of active material powder small in particle diameter tends to reduce collapse of particles, improving the life characteristics of the battery. To obtain powder of the Si-based material of 5 μm ($D_{50}$) or less in the conventional crashing process, however, huge crushing cost and processing time are required, and thus such powder is not suitable for mass production. The TAP density of the active material particles is preferably 0.01 to 2 $g/cm^3$.

If the median diameter ($D_{50}$) of the primary particles is less than 0.1 μm, the TAP density will decrease and also the specific surface area will increase, whereby the amount of the binder required for formation of the electrode tends to increase. As a result, the input/output characteristics and energy density of the electrode will decrease. If the median diameter exceeds 10 μm, adjustment will be difficult in the design of the electrical capacitance per unit area of the electrode.

As the active material, the Si-based material and a carbon material may be used as a mixture, or as composite powder. An electrode using such mixed powder or composite powder will be improved in chemical resistance (alkali resistance and acid resistance), and can be made resistant to generation of hydrogen in the process of applying the skeleton-forming agent. Also, since the electric conductivity of the active material improves, the output characteristics are improved.

As used herein, the terms "composite" and "mixture" are different concepts: while the mixed powder is mere gathering of alloy-based active material powder and carbon powder, both an alloy-based active material and a carbon material are contained in each particle constituting the composite powder. For example, a material made of the Si-based material coated with the carbon material is the composite powder.

With the presence of a material excellent in chemical resistance around (on the surface of) Si-based material particles as the core, dissolution of the active material and hydrogen generation can be prevented or reduced in the process of kneading the electrode slurry even though the slurry is alkaline or acid. Note that it is only necessary to have the Si-based material and a material excellent in chemical resistance in the composite powder as the main ingredient phase, and thus a slight amount of impurities is acceptable. Presence of a slight amount of impurities will not have a large adverse effect on the cycle life.

The active material of the present invention may also be a spherical granulated body (secondary particles) including a granulation binder. By granulating the active material with the granulation binder (forming secondary particles), which serves to prevent or reduce dropping off of the active material, the life characteristics of the electrode is improved. Also, with a conductive auxiliary previously included in the granulated body, a granulated active material high in electric conductivity can be formed, whereby an electrode active material excellent in output characteristics can be obtained. The granulated body has no specific limitation as long as the Si-based material described above is included. The median diameter ($D_{50}$) of the particles of the granulated body (secondary particles) is preferably greater than or equal to 0.5 µm and less than or equal to 50 µm.

If the particle diameter of the granulated body is excessively small, the aggregation stress of the slurry will become so great is the process of drying the slurry that the slurry will easily peel off and drop from the collector. By contrast, if the particle diameter is excessively great, uniform coating or filling of the collector with the electrode material will become difficult in the process of applying the slurry.

The granulated electrode active material is preferably a spherical granulated body. Being a spherical granulated body, the flowability as the powder improves and the dispersibility of the electrode material improves in the process of kneading the slurry, whereby an electrode excellent in uniformity can be easily obtained.

The median diameter ($D_{50}$) of the active material (primary particles) used for the granulated body is preferably greater than or equal to 0.1 µm and less than or equal to 10 µm, more preferably greater than or equal to 0.1 µm and less than or equal to 3 µm. Also, the active material for granulation may be the Si-based material described above, and is preferably the active material having any shape among a facet shape, a belt shape, a fiber shape, a needle shape, a flake shape, and a donut shape from the standpoint of the lyophilicity with the electrolytic solution. Note that two or more kinds of active materials for granulation can be used without any trouble.

Use of active material powder small in particle diameter tends to reduce collapse of particles and thus improve the life characteristics of the electrode. Also, the specific surface area tends to increase and thus improve the output characteristics. For example, Non-Patent Literature (Recent technical trend of rare metal-free secondary battery, Chapter 3, Section 1, Clause 4, pp. 125-135, CMC Publishing, 2013) describes that, as the particle diameter of the active material is smaller, the initial discharge capacity increases and the cycle life is improved. It is therefore found that the particle diameter of the active material has correlations with the initial discharge capacity and the cycle life.

A nano order sized active material is however difficult to handle, and thus preferably subjected to granulation. For example, JP 5525003 presents a negative electrode using a nano-granulated body that uses any one or more granulation binding agents among polyimide, polybenzimidazole, styrene-butadiene rubber, polyvinylidene fluoride, carboxymethyl cellulose, and polyacrylic acid. By granulating the nano-order active material, the stress exerted on the copper foil by expansion/contraction of the negative electrode active material is lessened, preventing deformation of the copper foil.

The material of the conductive auxiliary for the negative electrode is not specifically limited as long as it has electron conductivity, and the above-described metal, a carbon material, a conductive polymer, conductive glass, etc. can be used. Specific examples of these include acetylene black (AB), Ketjen black (KB), furnace black (FB), thermal black, lamp black, channel black, roller black, disk black, carbon black (CB), carbon fiber (e.g., vapor-grown carbon fiber named VGCF (registered trademark)), carbon nanotubes (CNT), carbon nanohorns, graphite, graphene, glassy carbon, and amorphous carbon. One kind or two or more kinds of these may be used.

The conductive auxiliary is preferably contained in an amount of 0 to 20 mass % with respect to the total of the active material, the binder, and the conductive auxiliary contained in the negative electrode being 100 mass %. That is, the conductive auxiliary is contained as required. If the content exceeds 20 mass %, the proportion of the active material will be small as the battery, so that the electrode capacitance density will tend to decrease.

As the binder for the negative electrode, one kind singularly, or two or more kinds in combination, of normally used ones, for example, the following organic materials may be used: polyvinylidene fluoride (PVdF), polytetrafluoroethylene (PTFE), polyimide (PI), polyamide, polyamide imide, aramid, polyacryl, styrene-butadiene rubber (SBR), an ethylene-vinyl acetate copolymer (EVA), a styrene-ethylene-butylene-styrene copolymer (SEBS), carboxymethyl cellulose (CMC), xanthan gum, polyvinyl alcohol (PVA), ethylene vinyl alcohol, polyvinyl butyral (PVB), ethylene vinyl alcohol, polyethylene (PE), polypropylene (PP), polyacrylic acid, lithium polyacrylate, sodium polyacrylate, potassium polyacrylate, ammonium polyacrylate, methyl polyacrylate, ethyl polyacrylate, amine polyacrylate, polyacrylic ester, epoxy resin, polyethylene terephthalate (PET), polybutylene terephthalate (PBT), nylon, vinyl chloride, silicone rubber, nitryl rubber, cyanoacrylate, urea resin, melamine resin, phenol resin, latex, polyurethane, silylated urethane, nitrocellulose, dextrin, polyvinyl pyrrolidone, vinyl acetate, polystyrene, chloropropylene, resorcinol resin, polyaromatic, denatured silicone, methacryl resin, polybutene, butyl rubber, 2-propenoic acid, cyanoacrylate, methyl methacrylate, glycidyl methacrylate, an acrylic oligomer, 2-hydroxyethyl acrylate, alginic acid, starch, Japanese lacquer, sucrose, glue, casein, and cellulose nanofiber.

A mixture of any of the above organic binders and an inorganic binder may also be used. The inorganic binder may be silicate-based, phosphate-based, sol-based, and cement-based. For example, one kind, or two or more kinds in combination, of the following inorganic materials may be used: lithium silicates, sodium silicates, potassium silicates, cesium silicates, guanidine silicates, ammonium silicates, silicofluorides, borates, lithium aluminates, sodium aluminates, potassium aluminates, aluminosilicates, lithium aluminate, sodium aluminate, potassium aluminate, polyaluminum chloride, polyaluminum sulfate, polyaluminum silicate sulfate, aluminum sulfate, aluminum nitrate, ammonium alum, lithium alum, sodium alum, potassium alum, chrome alum, iron alum, manganese alum, nickel ammonium sulfate, diatom earth, polyzirconoxane, polytantaloxane, mullite, white carbon, silica sol, colloidal silica, fumed silica, alumina sol, colloidal alumina, fumed alumina, zirconia sol, colloidal zirconia, fumed zirconia, magnesia sol, colloidal magnesia, fumed magnesia, calcia sol, colloidal calcia, fumed calcia, titania sol, colloidal titania, fumed titania, zeolite, silicoaluminophosphate zeolite, sepiolite, montmorillonite, kaolin, saponite, aluminum phosphates, magnesium phosphates, calcium phosphates, iron phosphates, copper phosphates, zinc phosphates, titanium phosphates, manganese phosphates, barium phosphates, tin phosphates, low melting point glass, plaster, gypsum, magnesium cement, litharge cement, Portland cement, slag cement, fly ash cement, silica cement, phosphate cement, concrete, and a solid electrolyte.

Among others, inorganic materials like lithium silicates, sodium silicates, potassium silicates, guanidine silicates, ammonium silicates, silicofluorides, aluminosilicates, aluminum phosphates, magnesium phosphates, and calcium phosphates are preferable from the standpoint of binding properties, resistance to elusion to the electrolytic solution, oxidation/reduction resistance, and energy density.

When the negative electrode is manufactured using an inorganic binder, however, the electrode energy density per unit weight tends to decrease because the specific gravity of the inorganic binder is large. Also, with an inorganic binder that is strongly acid or alkaline, hydrogen gas will be generated during mixing into slurry if an active material poor in chemical resistance, such as Si and Sn, is included. As a result, not only electrode coating will become difficult, but also foaming will occur dining the process of drying by heating, failing to manufacture a uniform electrode. Moreover, if the collector is poor in chemical resistance, it will be degraded.

As the binder for the negative electrode, PI has been conventionally considered preferable, when an alloy-based negative electrode active material is used, from the standpoint of preventing or reducing the volume change of the active material occurring along with charge/discharge and improving the cycle life characteristics of the battery. According to the present invention, however, since the volume change can be prevented or reduced with the skeleton-forming agent, any of the normally used ones described above can be used.

The binder is preferably contained by 0.1 to 60 mass %, more preferably by 0.5 to 30 mass %, with respect to the total of the active material, the binder, and the conductive auxiliary contained in the negative electrode being 100 mass %.

If the content of the binder is less than 0.1 mass %, the mechanical strength of the electrode will be low, causing the active material to easily drop off during skeleton formation and worsening the cycle life characteristics of the battery in some cases. If the content exceeds 60 mass %, the ion conductivity will be low, the electric resistance will be high, and, since the proportion of the active material is small as the battery, the electrode capacitance density tends to decrease.

The material of the collector used for the negative electrode is not specifically limited as long as it has electron conductivity and is capable of conducting electricity to the negative electrode active material retained thereto. For example, it is possible to use a conductive material such as C, Ti, Cr, Ni, Cu, Mo, Ru, Rh, Ta, W, Os, Ir, Pt, Al, and Au and an alloy containing two or more kinds of these conductive materials (e.g., stainless steel). When a material other than the above conductive materials is used, a multi-layer structure of dissimilar metals like cu- or Ni-coated iron, for example, may be used.

From the standpoint of high electric conductivity and good stability in the electrolytic solution, C, Ti, Cr, Au, Fe, Cu, Ni, and stainless steel are preferable. Further, from the standpoint of reduction resistance and the material cost, C, Cu, Ni, and stainless steel are preferable. Note that, when iron is used as the collector base material, it is preferable to be coated with Ni or Cu to prevent oxidation of the surface of the collector base material. Also, stainless steel or iron has been considered preferable as the collector base material since the conventional alloy-based negative electrode is large in the volume change of the negative electrode material occurring along with charge/discharge. According to the present invention, however, since the stress exerted on the collector can be lessened with the skeleton-forming agent, any of the normally used ones described above can be used.

The shape of the collector can be linear, bar-like, plate-like, foil-like, or porous. Among others, the porous shape may be used for the reasons that the filling density can be enhanced and that the skeleton-forming agent can easily permeate into the active material layer. Examples of the porous shape include a mesh, a woven fabric, a nonwoven fabric, an embossed body, a punched body, an expanded body, and a foam. Among others, as the shape of the collector base material, an embossed body or a foam is preferable for the reason that the output characteristics are good.

The negative electrode is a negative electrode for a lithium ion battery, and the skeleton-forming agent according to claim 1 is present at least in the active material layer. With this configuration, by coating the electrode with the skeleton-forming agent, the skeleton-forming agent permeates into the active material layer, forming a robust skeleton in the active material layer. This lessens the volume change of the electrode and improves the insulation properties on the surface of the electrode.

Also, in the negative electrode, the skeleton-forming agent according to claim 1 is present in the active material layer, and in the active material layer gaps are present inside the active material. With this configuration, by coating the negative electrode with the skeleton-forming agent, the skeleton-forming agent permeates into the active material layer. Thus, gaps inside the active material are not completely filled with the skeleton-forming agent in the active material layer, but gaps remain unfilled. This allows expansion/contraction of the active material during charge/discharge, and prevents or reduces occurrence of creases and cracks on the collector of the electrode.

The negative electrode has a layer including the alkali-resistant inorganic particles on the surface of the layer of the silicate-based skeleton-forming agent. With this configuration, having the layer of the inorganic particles, a robust skeleton can be formed, and also occurrence of peeling and cracking during drying can be prevented or reduced. Also, since the layer of the inorganic particles serves as the separator, a battery can be constituted without use of a separator separately. Note that, when the skeleton-forming agent is phosphate-based, a layer including acid-resistant inorganic particles will be formed.

In the negative electrode, preferably, the content of the skeleton-forming agent per unit area of the electrode subjected to single-sided coating is greater than or equal to 0.01 $mg/cm^2$ and less than or equal to 3 $mg/cm^2$, or the content of the skeleton-forming agent per unit area of the electrode subjected to both-sided coating is greater than or equal to 0.02 mg/cm$^2$ and less than or equal to 6 mg/cm$^2$. More preferably, the content of the skeleton-forming agent per unit area of the electrode subjected to single-sided coating is greater than or equal to 0.05 mg/cm$^2$ and less than or equal to 3 mg/cm$^2$, or the content of the skeleton-forming agent per unit area of the electrode subjected to both-sided coating is greater than or equal to 0.1 mg/cm$^3$ and less than or equal to 6 mg/cm$^2$. Note that for an electrode using a collector having a through hole, the conditions may be considered similar to those for the electrode subjected to both-sided coating.

In the negative electrode, the content of the skeleton-forming agent is preferably greater than or equal to 0.1 mass % and less than or equal to 30 mass %, more preferably greater than or equal to 0.2 mass % and less than or equal to 20 mass %, further preferably greater than or equal to 0.5 mass % and less than or equal to 10 mass %, with respect to the total of the solid content including the active material, the conductive auxiliary, the binder, and the skeleton-forming agent being 100 mass %.

Next, the positive electrode in the case of constituting a battery using the above negative electrode will be described. The active material used for the positive electrode is not specifically limited as long as it is a positive electrode active material used for a lithium ion battery. Known electrodes including alkali metal transition metal oxide-based, vanadium-based sulfur-based, solid solution-based (lithium-excess, sodium-excess, and potassium-excess), carbon-based, and organic electrodes are used.

The conductive auxiliary is not specifically limited as long as it has electron conductivity. For example, metal, a carbon material, a conductive polymer, and conductive glass may be used. From the standpoint of high electron conductivity and oxidation resistance, a carbon material is preferable.

The content of the conductive auxiliary is preferably 0 to 20 mass % with respect to the total of the active material, the binder, and the conductive auxiliary contained in the positive electrode being 100 mass %. That is, the conductive auxiliary is contained as required. If the content exceeds 20 mass %, the proportion of the active material is small as the battery, and thus the electrode capacitance density tends to decrease.

As the hinder for the positive electrode, general ones used for a lithium ion battery can be used. For example, one kind singularly, or two or more kinds in combination, of organic materials such as polyvinylidene fluoride (PVdF), polytetrafluoroethylene (PTFE), polyacryl, and alginic acid may be used. Also, any of the above organic binders and an inorganic binder may be mixed.

The inorganic binder may be silicate-based, phosphate-based, sol-based, or cement-based, for example. When the positive electrode is manufactured using only an inorganic binder, however, the electrode energy density per unit weight tends to decrease became the specific gravity of the inorganic binder is large.

As the binder for the positive electrode, a binder having high binding properties has been conventionally considered preferable, when a sulfur-based, vanadium-based, or a solid solution-based positive electrode active material is used, from the standpoint of preventing or reducing the volume change of the active material occurring along with charge/discharge and improving the cycle life characteristics of the battery. According to the present invention, however, since the volume change can be prevented or reduced with the skeleton-forming agent, any of the normally used ones described above can be used.

The content of the binder is preferably 0.1 to 60 mass % with respect to the total of the active material, the binder, and the conductive auxiliary being 100 mass %. If the content is less than 0.1 mass %, the mechanical strength of the electrode will be low, causing the active material to easily drop off during skeleton formation and worsening the cycle life characteristics of the battery in some cases. If the content exceeds 60 mass %, the ion conductivity will be low, the electric resistance will be high, and, since the proportion of the active material is small as the battery, the electrode capacitance density tends to decrease.

The material of the collector used for the positive electrode is not specifically limited as long as it has electron conductivity and is capable of conducting electricity to the positive electrode active material retained thereto. For example, it is possible to use a conductive material such as C, Ti, Cr, Ni, Cu, Mo, Ru, Rh, Ta, W, Os, Ir, Pt, Au, and Al and an alloy containing two or more kinds of these conductive materials (e.g., stainless steel). When a material other than the above conductive materials is used, a multi-layer structure of dissimilar metals like Al-coated iron, for example, may be used. From the standpoint of high electric conductivity and good stability in the electrolytic solution, C, Ti, Cr, Au, Al, and stainless steel are preferable. Further, from the standpoint of oxidation resistance and the material cost, C, Al, and stainless steel are preferable. More preferably, carbon-coated Al and carbon-coated stainless steel are preferable.

The shape of the collector can be linear, bar-like, plate-like, foil-like, or porous. Among others, the porous shape may be used for the reasons that the filling density can be enhanced and that the skeleton-forming agent can easily permeate into the active material layer. Examples of the porous shape include a mesh, a woven fabric, a nonwoven fabric, an embossed body, a punched body, an expanded body, and a foam. Among others, as the shape of the collector base material, an embossed body or a foam is preferable for the reason that the output characteristics are good.

The skeleton-forming agent according to the present invention can also be applied to the surface of the separator. With this configuration, a separator having high strength, excellent heat resistance, and improved cycle life characteristics is obtained. As the separator, one generally used for a lithium ion battery can be used. The material of the separator is not specifically limited. A separator coated or filled with ceramic so as to prevent the separator from melting down due to local heat generation during short-circuiting may be used. The shape of the separator is not specifically limited, but may be a microporous membrane, a woven fabric, a nonwoven fabric, or a powder compact.

By applying the skeleton-forming agent to the separator, it is possible to prevent or reduce short-circuiting of the battery caused by melting down of the separator base material due to local heat generation during short-circuiting. Also, since oxidation of the separator on the positive electrode side can lie prevented or reduced during charge of the battery, self-discharge of the battery is prevented or reduced. In addition, since the heat resistance of the separator improves, the safety of nail penetration and overcharge is improved.

The silicate-based skeleton-forming agent may include inorganic particles such as alkali-resistant ceramic. In this case, the particle diameter of the ceramic is preferably in the range of 0.2 to 20 μm, more preferably in the range of 0.25 to 10 μm. Note that, a phosphate-based skeleton-forming agent may include inorganic particles such as acid-resistant ceramic. In this case, also, the particle diameter is similar to the case of the silicate-based one.

The manufacturing method for the negative electrode according to the present invention includes: process A of applying a skeleton-forming agent including a silicate having a siloxane bond as an ingredient, or a skeleton-forming agent including a phosphate, to the surface of an active material layer of the negative electrode; and process B of drying the negative electrode. By this method, using the skeleton-forming agent for the manufacture of the negative electrode, a negative electrode having excellent heat resistance, high strength, and improved cycle life characteristics can be manufactured.

In process A, the skeleton-forming agent permeates from the surface of the active material layer into the inside thereof. Also, process A may be a process of immersing the negative electrode in a bath including the skeleton-forming agent.

Preferably, the solid content concentration of the silicate or the phosphate in the skeleton-forming agent is 0.1 to 30 mass %, and process B is a process of heat-treating the negative electrode at 60° C. or more. If it is dried at a temperature less than 60° C., the binding strength with the electrode and the separator will be low, and the water content cannot be sufficiently removed. As a result, when a battery is assembled, stable life characteristics will not be easily obtained.

For example, the electrode is obtained by: mixing the active material, the binder, and a conductive auxiliary added as required into slurry; applying the slurry to the collector, temporarily drying the resultant collector; then filling the active material layer with water containing the skeleton-forming agent dissolved therein; and performing heat treatment at 60° C. or more. That is, in the electrode obtained by the slurry coating method, the active material layer is filled with the skeleton-forming agent, and heat treatment is performed, to obtain the electrode. The way of the temporary drying is not specifically limited as long as the solvent in the slurry can be removed by volatilization. For example, a way of performing heat treatment at a temperature of 50 to 200° C. in the atmosphere can be used. The electrode can also be obtained by: mixing the active material, the binder, and a conductive auxiliary added as required into slurry; applying the slurry to the collector; and, in the state of the electrode being wet without temporary drying, filling the active material layer with water containing the skeleton-forming agent dissolved therein; and performing heat treatment at 60° C. or more.

The above heat treatment is preferably performed at 80° C. or more, more preferably at 100° C. or more, desirably at 110° C. or more for the reason that, as the temperature is higher, the heat treatment time can be shortened and the strength of the skeleton-forming agent improves. The upper-limit temperature of the heat treatment is not specifically limited as long as the collector is not melted. For example, the temperature may be raised up to about 1000° C. that is the melting point of copper. Conventionally, since the binder for the electrode used to be carbonized and the collector be softened, the upper-limit temperature was estimated to a temperature far below 1000° C. However, using the skeleton-forming agent of the present invention, which exhibits excellent heat resistance and is more robust than the collector, the upper limit of the temperature is set to 1000° C.

The heat treatment can be performed by keeping the temperature for 0.5 to 100 hours. The heat treatment may be performed in the air, but is preferably performed in a nonoxidative atmosphere for preventing oxidation of the collector. The nonoxidative atmosphere refers to an environment in which the abundance of oxygen gas is smaller than in the air. For example, it may be a reduced-pressure environment, a vacuum environment, a hydrogen gas atmosphere, a nitrogen gas atmosphere, or a rare gas atmosphere.

For an electrode using a material having an irreversible capacity, the irreversible capacity is preferably cancelled with lithium doping. The method of lithium doping is not specifically limited, but examples thereof include: (i) a method of sticking metal lithium to a portion of the electrode collector on which no active material layer is formed and forming a local cell by liquid injection, thereby doping the electrode active material with lithium; (ii) a method of sticking metal lithium to the active material layer on the electrode collector and causing forced short-circuiting by liquid injection, thereby doping the electrode active material with lithium; (iii) a method of forming metal lithium on the active material layer by evaporation and sputtering and doping the electrode active material with lithium by solid-phase reaction; (iv) a method of electrochemically doping the electrode before battery assembly with lithium in an electrolytic solution; and (v) a method of adding metal lithium to active material powder and mixing them, thereby doping the active material with lithium.

As another manufacturing method for the electrode, for example, there is a method in which, using chemical plating, sputtering, evaporation, gas deposition, etc., an active material or an active material derivative is deposited on a collector to form an active material layer and integrated. From the standpoint of the lyophilicity of the skeleton-forming agent and the electrode manufacturing cost, however, the slurry coating method is preferable.

The lithium ion battery according to the present invention includes the negative electrode according to any one of claims 2 to 8. With this configuration, a battery having excellent cycle life characteristics and good safety can be obtained.

For example, the battery using the above-described negative electrode is considered to have a structure in which the positive electrode and the negative electrode are joined together via the separator and sealed in the state of being immersed in the electrolytic solution. The structure of the battery is not limited to this, but the present invention is also applicable to the existing battery forms and structures such as laminated batteries and wound batteries.

The electrolyte used for the battery may just be a liquid or a solid that permits migration of lithium ions from the positive electrode to the negative electrode, or from the negative electrode to the positive electrode. The same one as the electrolyte used for a known lithium ion battery can be used. For example, an electrolytic solution, a gel electrolyte, a solid electrolyte, an ionic liquid, and molten salt may be used. The electrolytic solution as used herein refers to an electrolyte dissolved in a solvent.

The electrolyte needs to contain lithium ions. Therefore, the kind of the electrolyte salt is not specifically hunted as long as it is one used for a lithium ion battery, but lithium salt is suitable. As the lithium salt, at least one selected from the group consisting of lithium hexafluorophosphate ($LiPF_6$), lithium perchlorate ($LiClO_4$), lithium tetrafluoroborate ($LiBF_4$), lithium trifluoromethanesulfonate ($LiCF_3SO_4$), lithium bis(trifluoromethanesulfonyl)imide (LiN(SO$_2$CF$_3$)$_2$), lithium bis(pentafluoroethanesulfonyl)imide (LiN(SO$_2$C$_2$F$_5$)$_2$), and lithium bisoxalateborate (LiBC$_4$O$_8$) can be used.

The kind of the solvent for the electrolyte is not specifically limited as long as it is one used for a lithium ion battery. For example, at least one kind selected from the group consisting of propylene carbonate (PC), ethylene carbonate (EC), dimethyl carbonate (DMC), diethyl carbonate (DEC), ethylmethyl carbonate (EMC), γ-butyrolactone (GBL), methyl-γ-butyrolactone, dimethoxymethane (DMM), dimethoxyethane (DME), vinylene carbonate (VC), vinylethylene carbonate (EVC), fluoroethylene carbonate (FEC), and ethylene sulfite (ES) can be used. Among others, an electrolyte solvent containing FEC is preferable. FEC is preferably contained by 0.1 to 20 mass %, more preferably by 1 to 10 mass %, with respect to the electrolytic solution (the total amount of the electrolyte and the solvent) being 100 mass %.

The ionic liquid and the molten salt are classified into pyridiue-based, alicyclic amine-based, and aliphatic amine-based groups depending on the kind of cations (positive ions). By selecting the kind of anions (negative ions) to be combined with the cations, a variety of ionic liquids or molten salt can be synthesized. Examples of cations include ammonium-based ones such as imidazolium salt and pyridinium salt, phosphonium ions, and inorganic ions, and examples of anions include halogen-based ones such as bromide ions and triflate, boron-based ones such as tetraphenyl borate, and phosphorous-based ones such as hexafluorophosphate.

The ionic liquid and the molten salt can be obtained by a known synthesizing method such as combining cations such as imidazolium and anions such as Br$^-$, Cl$^-$, BF$_4^-$, PF$_6^-$, (CF$_3$SO$_2$)$_2$N$^-$, CF$_3$SO$_3^-$, and FeCl$_4^-$. The ionic liquid and the molten salt can function as the electrolytic solution without addition of an electrolyte.

The electric apparatus according to the present invention includes the battery according to claim 10.

Advantageous Effects of Invention

By using the skeleton-forming agent according to the present invention for a negative electrode of a lithium ion battery, occurrence of creases and cracks can be prevented or reduced, unlike the case of using the skeleton-forming agent as a binder. The resultant negative electrode can exhibit good life characteristics compared to the conventional ones, and also can reduce heat generation due to internal short-circuiting even when the electron conductivity of the active material layer is high.

MODE FOR CARRYING OUT THE INVENTION

Figure 1:
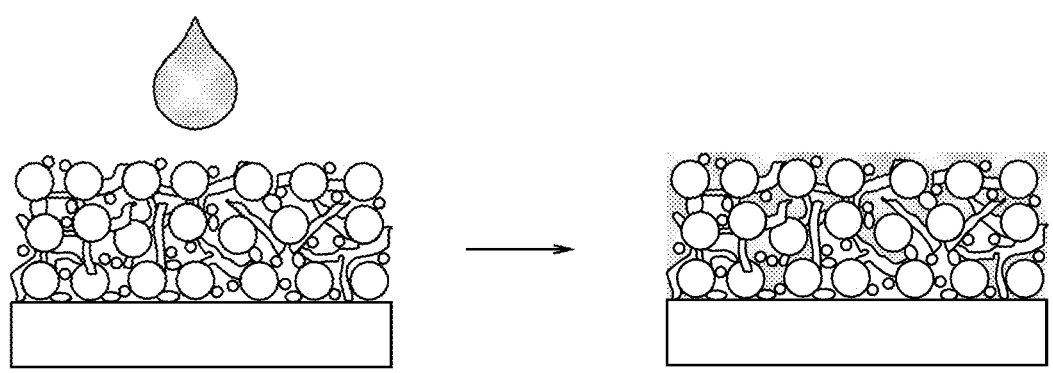
FIG. 1 is a schematic view showing a cross section of an electrode coated with a skeleton-forming agent according to an embodiment of the present invention.

Hereinafter, an embodiment of the present invention will be described with reference to the drawings. Note however that the present invention is not limited to this embodiment. In particular, while an electrode of a lithium secondary battery (lithium ion battery) will be described as an example in this embodiment, the present invention is not limited to this electrode. Also, while an alkali metal silicate aqueous solution including Na$_2$O.3SiO$_2$ will be mainly described as an example of a skeleton-forming agent, the present invention is not limited to this.

First Embodiment

1. MANUFACTURING METHOD FOR ELECTRODE

First, as an example of this embodiment, a manufacturing method for an electrode for a lithium ion battery will be described. Note that, as the electrode, there are a negative electrode and a positive electrode, which are mainly different from each other in their collectors and active materials, but the manufacturing methods for these electrodes are alike. Therefore, the manufacturing method for the negative electrode will be described hereinafter omitting appropriately the manufacturing method for the positive electrode.

The negative electrode is manufactured by applying an electrode material to copper foil. First, 10 μm-thick rolled copper foil, for example, is produced to prepare copper foil wound into a roll shape. Also, as the electrode material of the negative electrode, artificial graphite obtained by burning a carbon derivative is mixed with a binder, a conductive auxiliary, etc. to form a paste. In this embodiment, as an example, PVdF is used as the binder, and acetylene black (AB) is used as the conductive auxiliary. The copper foil is coated with the electrode material, and, after drying, the pressure is regulated, to complete the negative electrode body.

The positive electrode is manufactured by applying an electrode material to aluminum foil. As the electrode material of the positive electrode, a lithium-transition metal oxide is mixed with a binder, a conductive auxiliary, etc. to form a paste. In this embodiment, as an example, PVdF is used as the binder, and AB is used as the conductive auxiliary. Hereinafter, the positive electrode body and the negative electrode body may be collectively referred to as the electrode body, the copper foil and the aluminum foil may be collectively referred to as the collector, and the electrode material applied to the collector may be referred to as the active material layer in some cases.

In this embodiment, the skeleton-forming agent used for the electrode body is prepared in advance. The skeleton-forming agent is produced by dry- or wet-purifying Na$_2$O.3SiO$_2$, an alkali metal silicate having a siloxane bond and adjusting the purified one by adding water. For example, the dry purification follows formula 4 below, and the wet purification follows formula 5 below. A surfactant is mixed in at this time. As an example of the skeleton-forming agent of this embodiment, the solid content concentration of Na$_2$O.3SiO$_2$ in the skeleton-forming agent is 5 mass %, and that of the surfactant is 0.04 mass %.

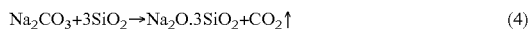

$$Na_2CO_3 + 3SiO_2 \rightarrow Na_2O.3SiO_2 + CO_2\uparrow \quad (4)$$

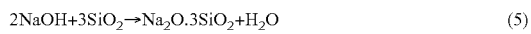

$$2NaOH + 3SiO_2 \rightarrow Na_2O.3SiO_2 + H_2O \quad (5)$$

The skeleton-forming agent is then applied to the surface of each electrode body, to coat the active material layer. The application of the skeleton-forming agent is performed by a method of immersing the electrode body in a bath retaining the skeleton-forming agent, a method of dropping or applying the skeleton-forming agent to the surface of the electrode body, spray coating, screen printing, a curtain method, spin coating, gravure coating, and dye coating. The skeleton-forming agent applied to the surface of the electrode body permeates into the inside of the active material layer, entering gaps of the active material and the conductive auxiliary. The electrode body is then dried by hot air of 110° C. to 160° C., heating, etc. to harden the skeleton-forming agent. In this way, the skeleton-forming agent forms the skeleton of the active material layer.

Finally, both electrode bodies, i.e., the negative electrode body and the positive electrode body, are cut into desired sizes, to complete the skeleton-formed electrodes.

The electrode manufacturing method described above can be implemented by a manufacturing apparatus. The collector wound in a roll form is fed out and coated with the electrode material in an active material layer coating device. The electrode material is then dried by hot air in a first dryer. The resultant electrode body is coated with the skeleton-forming agent in a skeleton-forming agent coating device. The skeleton-forming agent is then dried by hot air in a second dryer and hardened. The resultant electrode is wound up into a roll form. Finally, the wound electrode is cut into a desired size.

According to the electrode manufacturing method described above, electrodes having high strength, excellent heat resistance, and improved cycle life characteristics can be manufactured continuously. Also, using a silicate having a siloxane bond as the skeleton-forming agent, not as a binder, no creases or cracks occur on the copper foil, and no cracking, warping, or expansion due to generated gas occur in the active material layer, permitting use as the electrode.

The thus-obtained positive electrode and negative electrode are joined together via a separator and sealed in the state of being immersed in an electrolytic solution, to obtain a lithium ion battery. The lithium ion battery having this structure can function as a lithium ion battery having good safety. The structure of the lithium ion battery is not specifically limited, but the present invention is applicable to the existing battery forms and structures such as laminated batteries and wound batteries.

2. CONFIGURATION OF ELECTRODE

The negative electrode for a lithium ion battery manufactured by the manufacturing method described above includes the copper foil collector and the active material layer including the active material, the conductive auxiliary, and the binder, formed on the surface of the collector. The surface of the active material layer is coated with the hardened skeleton-forming agent, and the hardened skeleton-forming agent is also present inside the active material layer. The skeleton-forming agent inside the active material layer is present in gaps of the active material, the conductive auxiliary, and the binder so as to cover them. The density of the skeleton-forming agent in the active material layer is 0.7 mg/cm$^2$ as an example, and preferably in the range of 0.1 to 3 mg/cm$^2$.

The negative electrode of tins embodiment includes Si particles in the active material. The Si particles may have a shape such as a facet shape, a belt shape, a fiber shape, a needle shape, and a flake shape, and the median diameter (D$_{50}$) is greater than or equal to 0.1 μm and less than or equal to 10 μm. With the presence of the active material particles having these shapes, the active material particles are entangled with one another, achieving surface contact, and also an anchoring effect occurs between the active material particles, whereby the resultant electrode is resistant to collapse of the conductive network. Also, since the Si particles having the above shapes are bulky compared to particles having a spherical shape and an oval shape, space is produced between the active material particles. With the presence of such space in the active material layer, permeation of the skeleton-forming agent is prompted by the capillary phenomenon, permitting formation of the skeleton-forming body excellent in uniformity in the negative electrode.

For a similar reason, permeation of the electrolytic solution is also promoted, improving the ion conductivity of the negative electrode material. Also, since the space serves as room for lessening the volume change occurring along with occlusion/release of Li, excellent cycle life characteristics are obtained.

The Si particles contain oxygen in a proportion of 0.5 to 10 mass %. With this, the irreversible capacity is controlled, the energy density of the battery improves, and the stability of the active material increases.

Further, the Si particles have a work-affected layer. The work-affected layer, which has generated residual distortion, causes residual stress, storing energy therein in the form of potential energy. For this reason, the work-affected layer portion is high in energy level compared to the crystalline Si, and has been activated. The Si particles having such a work-affected layer are therefore small in stress exerted at initial charge/discharge compared to the crystalline Si-based material, whereby pulverization of the active material can be prevented or reduced, and thus a longer life of the battery can be expected.

The Si particles described above can be obtained by the following method, for example. Specifically, they can be manufactured by a process such as cutting, shaving, polishing, grinding, rubbing, and abrading of a silicon ingot as the active material. In this embodiment, as an example, a silicon ingot or massive silicon is cut with a diamond powder-supported wire saw having a wire diameter of 0.1 to 0.2 mm, to obtain cut powder produced at this cutting.

Figure 22:
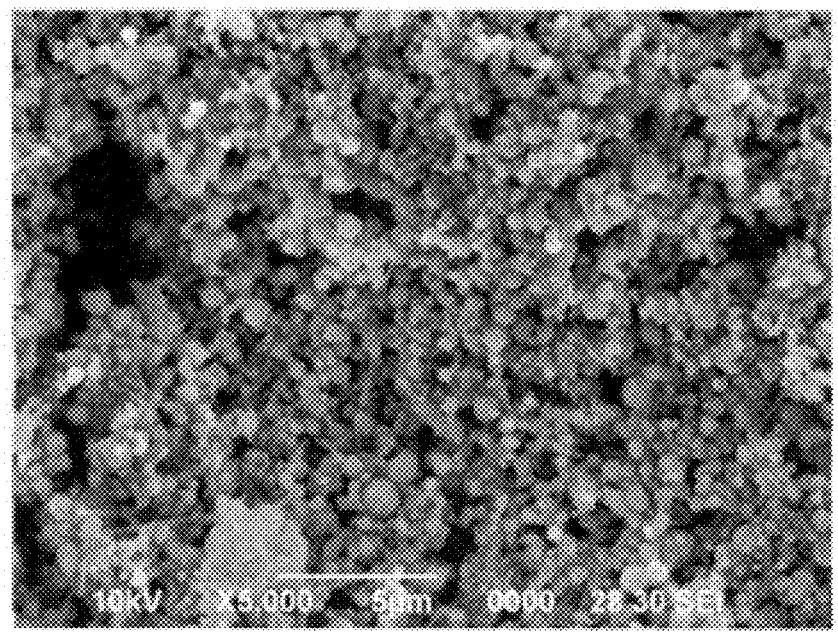
FIG. 22 shows a SEM image of Si particles of a negative electrode active material according to an embodiment of the present invention.

As another method, Si particles can be obtained by reducing a silicon tetrachloride liquid with zinc gas at a high temperature. In this case, Si particles conforming to the Si according to the present invention are obtained although the number of spherical particles is somewhat large. Note that the actually produced Si particles had an average particle diameter of 1.3 μm as measured by a laser method, and fundamental particles had diameters of roughly 1 μm or less by SEM observation (see FIG. 22).

On the other hand, the positive electrode includes the aluminum foil collector and the active material layer including the active material, the conductive auxiliary, and the binder, formed on the surface of the collector. The surface of the active material layer is coated with the hardened skeleton-forming agent, and the hardened skeleton-forming agent is also present inside the active material layer. The skeleton-forming agent inside the active material layer is present in gaps in the active material, the conductive auxiliary, and the binder so as to cover them. The density of the skeleton-forming agent in the active material layer is 0.5 mg/cm$^2$ as an example, and preferably in the range of 0.1 to 3 mg/cm$^2$.

The electrode of this embodiment has high strength, excellent heat resistance, and improved cycle life characteristics. Also, as shown in the results of the nail penetration test described later, the nail penetration safety improves. Since the skeleton-forming agent is applied to the surface of the electrode by coating and immersion, the skeleton-forming agent is present in gaps so as to cover the active material, the conductive auxiliary, and the binder inside the active material layer. That is, in the case of using the skeleton-forming agent by kneading the agent in the binder, the skeleton-forming agent will be present in the active material layer with roughly no space inside. In the electrode of this embodiment, however, a certain number of gaps are present inside the active material layer. This allows expansion/contraction of the electrode, and can prevent or reduce occurrence of creases and cracks on the collector.

3. CONFIGURATION OF SKELETON-FORMING AGENT

As described above, the skeleton-forming agent of this embodiment includes $Na_2O.3SiO_2$, an alkali metal silicate having a siloxane bond, in a solid content concentration of 7.5 mass % and a surfactant in 0.09 mass %, and the remainder is water. The surfactant is not essential, but, with this, the lyophilicity to the active material layer improves and the skeleton-forming agent permeates into the active material layer uniformly.

While the skeleton-forming agent of this embodiment uses the alkali metal sodium silicate, $Na_2O.3SiO_2$, as the silicate, the silicate is not limited to this, but Na may be replaced with Li, K, a triethanol ammonium group, a tetramethanol ammonium group, a tetraethanol ammonium group, and guanidine group.

Na is used because Na has high strength and excellent cycle life characteristics. Use of both Na and Li is possible, where the ion conductivity will improve by use of Li. In this case, Li<Na is preferable. With this, the resultant skeleton-forming agent will retain given strength and exhibit good ion conductivity. More specifically, Na is preferably contained in the range of 51% to 99% and Li in the range of 1% to 49%, more preferably Na in the range of 70% to 98% and Li in the range of 2% to 30%, with respect to the total of Na and Li being 100 mol %.

In the skeleton-forming agent of this embodiment, although the coefficient of $SiO_2$ is 3, but it is not limited to this, but may be greater than or equal to 0.5 and less than and equal to 5.0, preferably greater than or equal to 2.0 and less than and equal to 4.5, further preferably greater than or equal to 2.2 and less than and equal to 3.8.

The skeleton-forming agent of this embodiment can be used for coating of an existing electrode. By this coating, an electrode having high strength, excellent heat resistance, and improved cycle life characteristics is obtained.

The skeleton-forming agent of this embodiment can be used for coating of the surface of the separator. By this coating, a separator having high strength, excellent beat resistance, and improved cycle life characteristics is obtained.

4. EXAMPLES

Hereinafter, examples in this embodiment in which the solid content concentration of the skeleton-forming agent and the skeleton density are changed variously will be described together with their tests, results, and effects.

<Examination of n Number and Skeleton Density in $Na_2O.nSiO_2$>

Examples 1 to 18 and Comparative Example 1

Tests on the cycle life characteristics observed when a Si—C granulated body was used as the electrode active material, and the solid content concentration of $Na_2O.nSiO_2$ as the skeleton-forming agent was changed in the range of 0 mass % to 20 mass % and the value of n was changed to 2.0, 2.5, and 3.0 under the conditions of 0.2 C-rate, a cutoff potential of 0.01 V to 1.2 V (vs. Li$^+$/Li), and 30° C. The Si—C granulated body ($D_{50}$=9.8 μm) was produced by spray-drying a suspension made of Si ($D_{50}$=1.1 μm), artificial graphite ($D_{50}$=1 μm) (Si:artificial graphite=29:71 mass %), and a granulating auxiliary under the conditions of a feeding rate of 6 g/min, a spray pressure of 0.1 MPa, and a drying temperature of 80° C. to 180° C.

As the granulating auxiliary, polyvinyl alcohol (PVA, POVAL 1400) was used. PVA is contained by 1 mass % with respect to the solid content constituted by Si, the artificial graphite, and PVA being 100 mass %. The value affix denotes the median diameter by laser diffraction/dispersion particle size distribution measurement.

Test electrodes (1.4 mAh/cm$^2$) were manufactured by: coating copper foil with slurry made of the Si—C granulated body, AB, vapor-grown carbon fiber (VGCF), copper flakes, and PVdF (solid content ratio: 85:3:1:1:10 mass %) and regulating the pressure; immersing the resultant coated foil in an aqueous solution with a given skeleton-forming agent dissolved therein; and performing heat treatment at 160° C. As the counter electrode, metal lithium foil was used. As the separator, a glass nonwoven fabric (GA-100 manufactured by Toyo Roshi Kaisha, Ltd.) and a polyethylene (PE) microporous membrane (20 μm) were used. As the electrolytic solution, 1.0 M LiPF$_6$/(EC:DEC=50:50 vol %, +1 mass % of viuylene carbonate) was used.

Table 1 shows the solid content concentration of the skeleton-forming agent and the value of n of Na$_2$O.nSiO$_2$ for each of Examples 1 to 18 and Comparative Example 1. Each inorganic skeleton-forming agent was produced by preparing a mixture of Na$_2$CO$_3$ and SiO$_2$ to have a composition shown in Table 1, melting the preparation by healing to 1000° C. or more; and, after cooling, dissolving the preparation in water.

TABLE 1

| Na$_2$O•$n$SiO$_2$ | Na$_2$O•$n$SiO$_2$ Solid content concentration (mass %) | Skeleton density (mg/cm$^2$) | Test example |
|---|---|---|---|
| n = 2.0 | 0.5 | 0.04 | Example 1 |
| | 1 | 0.10 | Example 2 |
| | 2 | 0.14 | Example 3 |
| | 5 | 0.58 | Example 4 |
| | 10 | 0.73 | Example 5 |
| | 20 | 2.06 | Example 6 |
| n = 2.5 | 0.5 | 0.06 | Example 7 |
| | 1 | 0.10 | Example 8 |
| | 2 | 0.35 | Example 9 |
| | 5 | 0.58 | Example 10 |
| | 10 | 1.61 | Example 11 |
| | 20 | 5.27 | Example 12 |
| n = 3.0 | 0.5 | 0.22 | Example 13 |
| | 1 | 0.24 | Example 14 |
| | 2 | 0.38 | Example 15 |
| | 5 | 0.99 | Example 16 |
| | 10 | 1.29 | Example 17 |
| | 20 | 3.15 | Example 18 |
| — | 0 | 0 | Comparative Example 1 |

Figure 4:
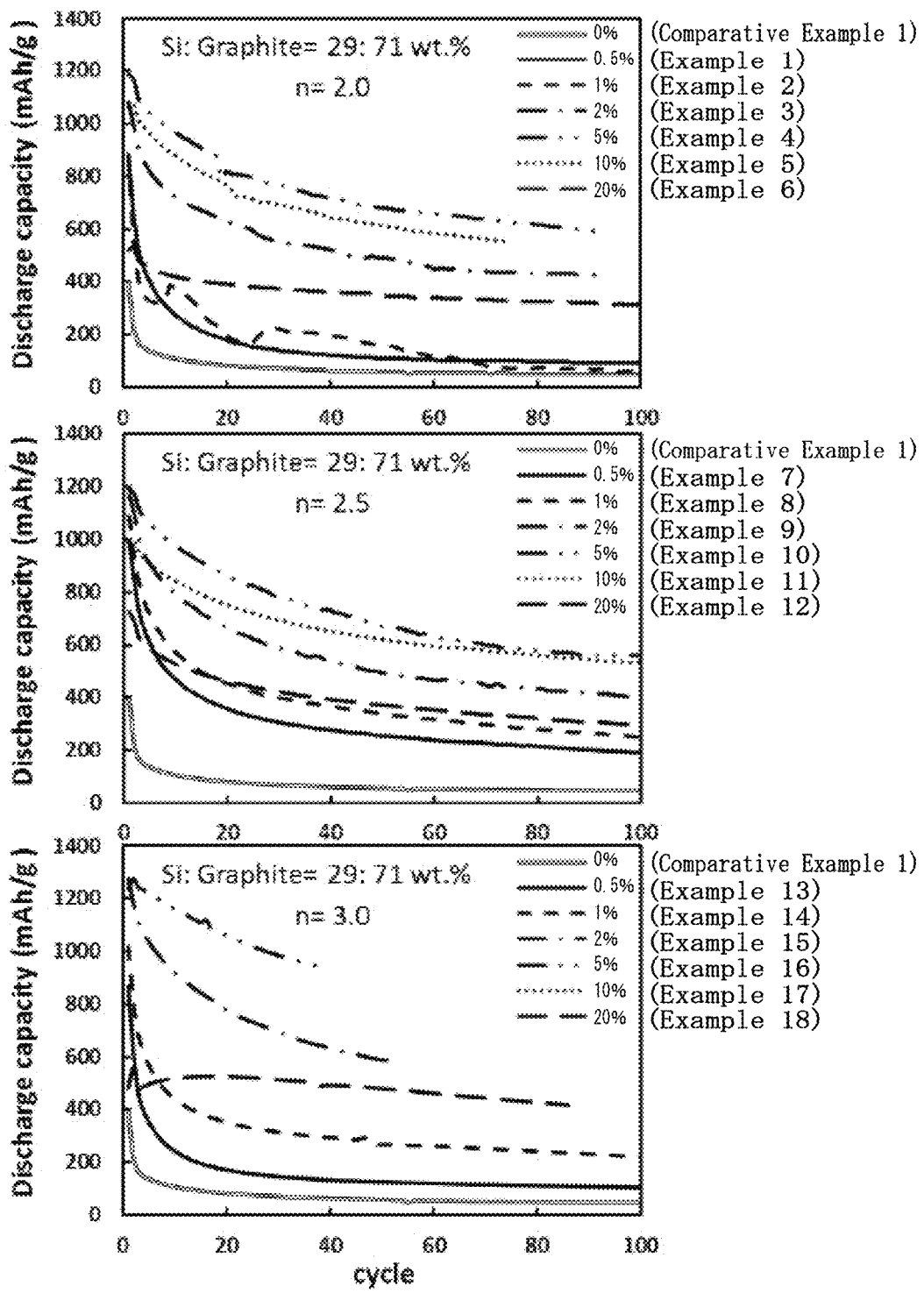
FIG. 4 includes views showing the cycle life characteristics of electrodes according to an embodiment of the present invention.

FIG. 4 shows graphs of the cycle life characteristics of Examples 1 to 18 and Comparative Example 1. As is evident from FIG. 4, the life characteristics of the negative electrodes coated with the skeleton-forming agent (Examples 1 to 18) were greatly improved compared to those of the uncoated negative electrode (Comparative Example 1). Among others, especially excellent cycle life characteristics were exhibited when the solid content concentration of Na$_2$O.nSiO$_2$ was in the range of 2 to 10 mass %. Also, especially excellent cycle life characteristics were exhibited when the value of n in Na$_2$O.nSiO$_2$ was 3.0.

Figure 5:
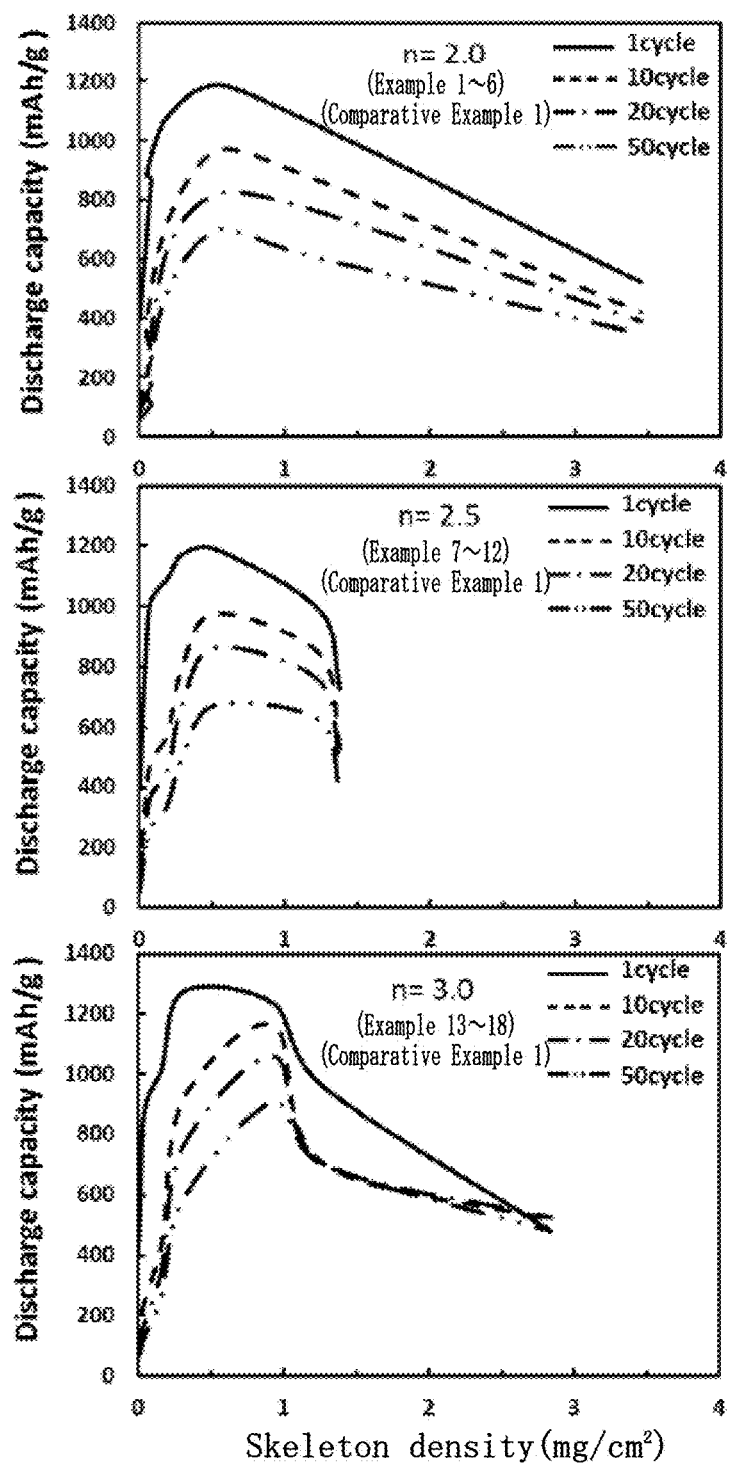
FIG. 5 includes views showing the relationships between the skeleton density and the discharge capacity of electrodes according to an embodiment of the present invention.

FIG. 5 shows graphs of the relationships between the density of the skeleton-forming body (skeleton density) and the discharge capacity at each cycle in Examples 1 to 18 and Comparative Example 1. As is evident from FIG. 5, for the electrode using the Si—C granulated body (Si:artificial graphite=29:71 mass %) as the active material, a sufficient discharge capacity is obtained when the skeleton density is 0.04 to 3.15 mg/cm$^2$. More preferably, the skeleton density is 0.1 to 2.5 mg/cm$^2$.

Examples 19 to 36 and Comparative Example 2

Examples 19 to 36 and Comparative Example 2 are similar to the previous tests (Examples 1 to 18 and Comparative Example 1) except that the composition of the Si—C granulated body was changed from Si:artificial graphite=29:71 mass % to 46:54 mass %, and the capacity density of test electrodes was set to 1.2 mAh/cm$^2$. Table 2 shows the solid content concentration of the skeleton-forming agent and the value of n of Na$_2$O.nSiO$_2$ for each of Examples 19 to 36 and Comparative Example 2.

TABLE 2

| Na$_2$O•$n$SiO$_2$ | Na$_2$O•$n$SiO$_2$ Solid content concentration (mass %) | Skeleton density (mg/cm$^2$) | Test example |
|---|---|---|---|
| n = 2.0 | 0.5 | 0.05 | Example 19 |
| | 1.0 | 0.08 | Example 20 |
| | 2.0 | 0.19 | Example 21 |
| | 5.0 | 0.55 | Example 22 |
| | 10 | 1.16 | Example 23 |
| | 20 | 3.45 | Example 24 |
| n = 2.5 | 0.5 | 0.07 | Example 25 |
| | 1.0 | 0.19 | Example 26 |
| | 2.0 | 0.29 | Example 27 |
| | 5.0 | 0.52 | Example 28 |
| | 10 | 1.24 | Example 29 |
| | 20 | 1.38 | Example 30 |
| n = 3.0 | 0.5 | 0.03 | Example 31 |
| | 1.0 | 0.16 | Example 32 |
| | 2.0 | 0.31 | Example 33 |
| | 5.0 | 0.93 | Example 34 |
| | 10 | 1.27 | Example 35 |
| | 20 | 2.84 | Example 36 |
| — | 0 | 0 | Comparative Example 2 |

Figure 6:
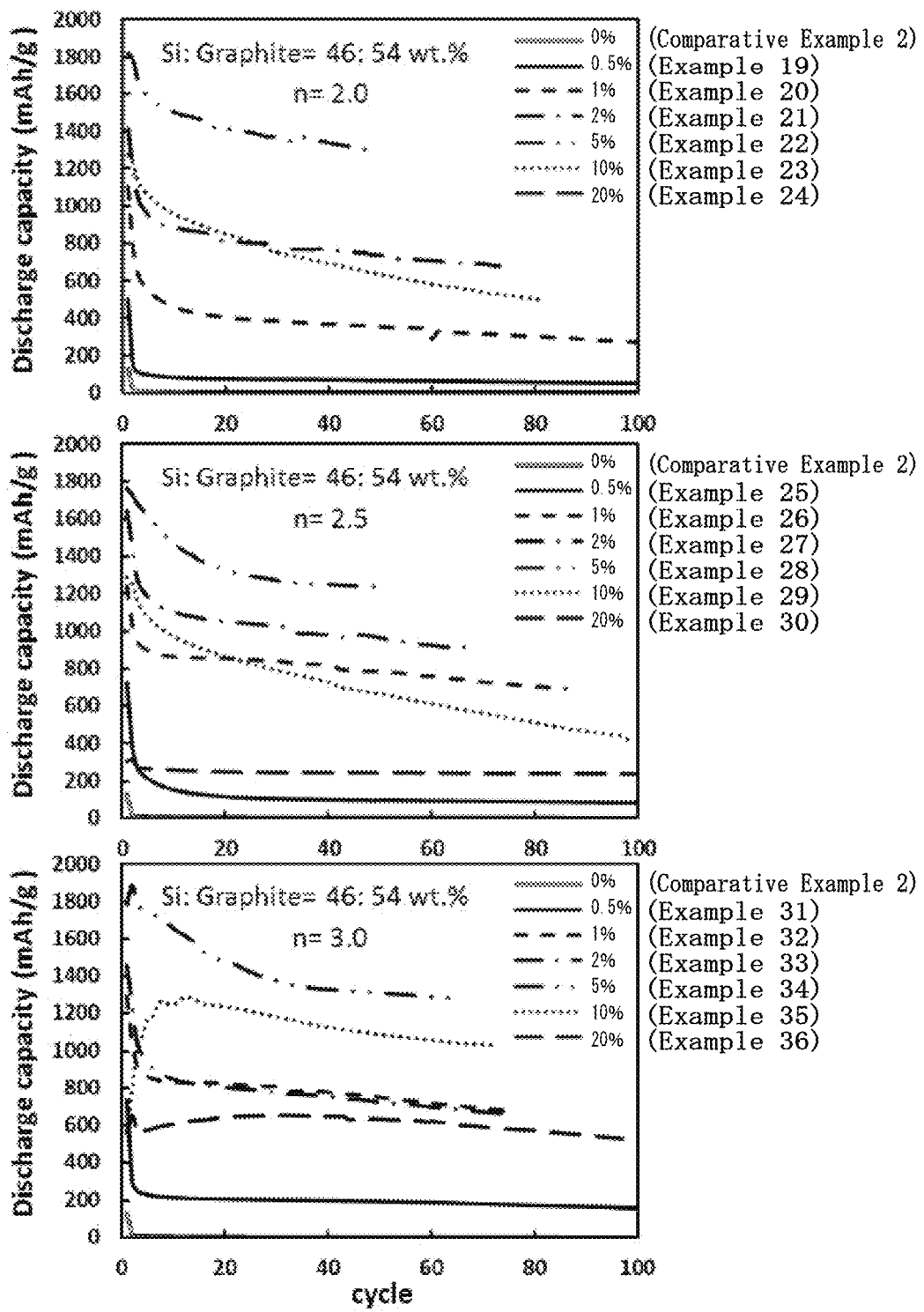
FIG. 6 includes views showing the cycle life characteristics of electrodes according to an embodiment of the present invention.

FIG. 6 shows graphs of the cycle life characteristics of Examples 19 to 36 and Comparative Example 2. As is evident from FIG. 6, the life characteristics of the negative electrodes coated with the skeleton-forming agent (Examples 19 to 36) were greatly improved compared to those of the uncoated negative electrode (Comparative Example 2). Among others, especially excellent cycle life characteristics were exhibited when the solid content concentration of Na$_2$O.nSiO$_2$ was in the range of 2 to 10 mass %. Also, especially excellent cycle life characteristics were exhibited when tire value of n in Na$_2$O.nSiO$_2$ was 3.0.

Figure 7:
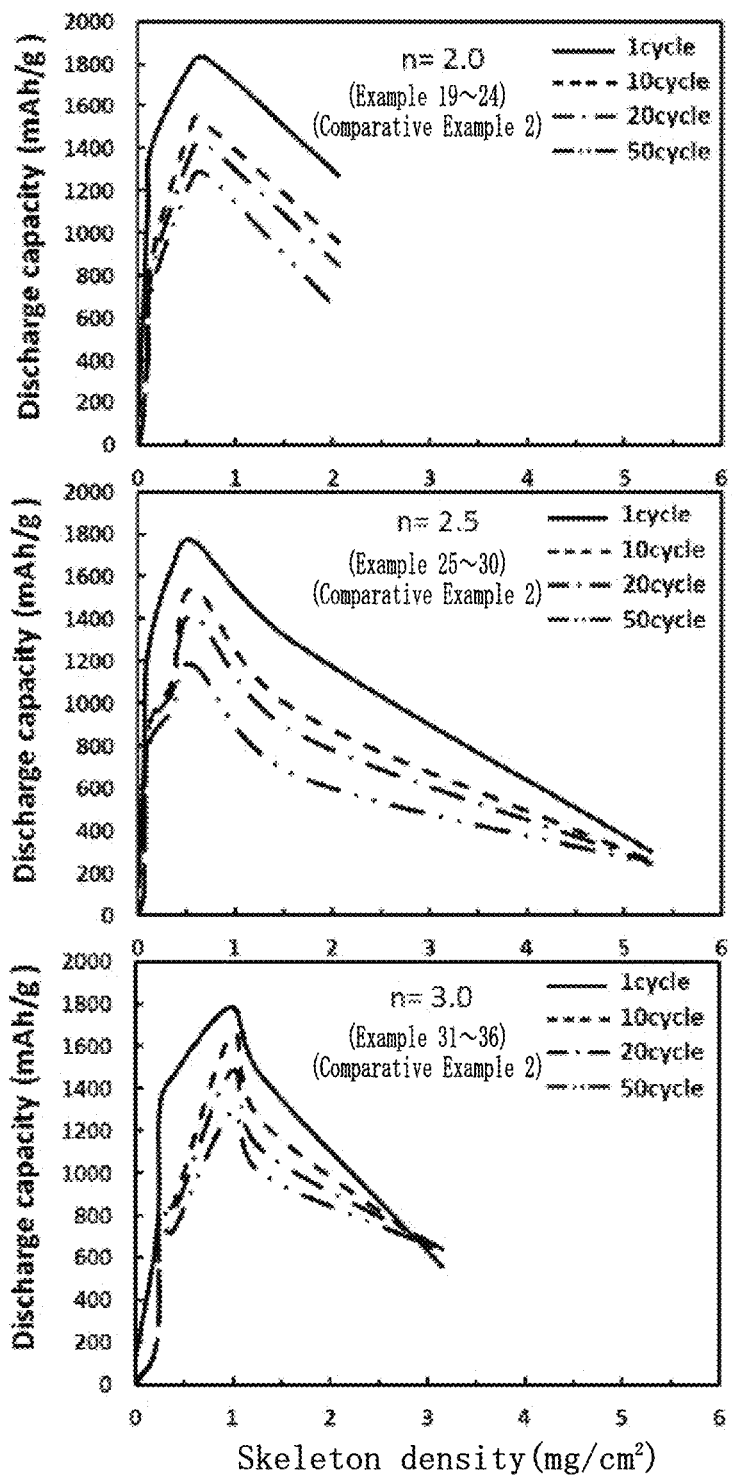
FIG. 7 includes views showing the relationships between the skeleton density and the discharge capacity of electrodes according to an embodiment of the present invention.

FIG. 7 shows graphs of the relationships between the density of the skeleton-forming body (skeleton density) and the discharge capacity at each cycle in Examples 19 to 36 and Comparative Example 2. As is evident from FIG. 7, for the electrode using the Si—C granulated body (Si:artificial graphite=46:54 mass %) as the active material, a sufficient discharge capacity is obtained when the skeleton density is 0.03 to 3.45 mg/cm$^2$. More preferably, the skeleton density is 0.1 to 2.5 mg/cm$^2$.

Examples 3 to 40 and Comparative Example 3

Examples 37 to 40 and Comparative Example 3 are similar to the previous tests (Examples 1 to 18 and Comparative Example 1) except that Si ($D_{50}$=1.1 μm) was used as the active material, $Li_{0.05}Na_{1.95}O \cdot 3SiO_2$ was used as the skeleton-forming agent, the capacity density of test electrodes was set to 3.0 mAh/cm², and the charge/discharge test was made under the conditions of 0.1 C-rate and a cutoff potential of 0.01 V to 1.4 V (vs. Li⁺/Li). Table 3 shows the solid content concentration of the skeleton-forming agent and the skeleton density of the electrode for each of Examples 37 to 40 and Comparative Example 3. The inorganic skeleton-forming agent was produced by preparing a mixture of $Li_2CO_3$, $Na_2CO_3$ and $SiO_2$ to have a composition shown in Table 3, melting the preparation by heating to 1000° C. or more; and, after cooling, dissolving the preparation in water.

TABLE 3

| $Li_{0.05}Na_{1.95}O \cdot nSiO_2$ | $Li_{0.05}Na_{1.95}O \cdot nSiO_2$ Solid content concentration (mass %) | Skeleton density (mg/cm²) | Test example |
|---|---|---|---|
| n = 3.0 | 0.5 | 0.12 | Example 37 |
|  | 1.0 | 0.48 | Example 38 |
|  | 2.5 | 0.90 | Example 39 |
|  | 5.0 | 1.77 | Example 40 |
|  | 0 | 0 | Comparative Example 3 |

Figure 8:
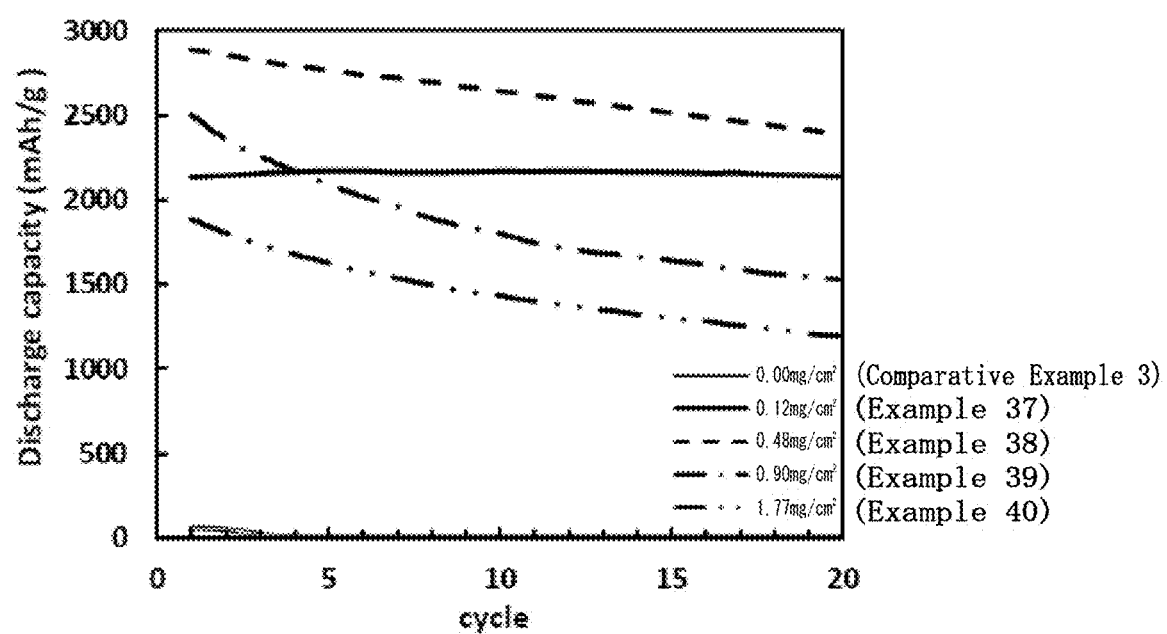
FIG. 8 is a view showing the cycle life characteristics of electrodes according to an embodiment of the present invention.

FIG. 8 is a graph showing the cycle life characteristics of Examples 37 to 40 and Comparative Example 3. As is evident from FIG. 8, while the initial discharge capacity of the negative electrode coated with the skeleton-forming agent (Examples 37 to 40) exceeded 1800 mAh/g, that of the uncoated negative electrode (Comparative Example 3) was 56.7 mAh/g. As is found from comparing the negative electrodes coated with the skeleton-forming agent (Examples 37 to 40) to the uncoated electrode (Comparative Example 3), significant improvement was exhibited in the cycle life characteristics. Among others, especially excellent cycle life characteristics were exhibited when the solid content concentration of $Li_{0.05}Na_{1.95}O \cdot 3SiO_2$ was in the range of 0.5 to 2.5 mass %. It was found that, for the electrode using Si as the active material, a discharge capacity exceeding 2000 mAh/g was obtained when the skeleton density was 0.12 to 0.90 mg/cm².

The batteries after charging/discharging (20 cycles) in Examples 37 to 40 and Comparative Example 3 were disassembled, and the test electrodes were observed. As a result, while the active material layer peeled off from the collector in Comparative Example 3, the active material layers did not peel off from the collectors and no creases or cracks were observed in the collectors in Examples 37 to 40. From these results, it became evident that the electrode coated and filled with the skeleton-forming agent was enhanced in the adhesiveness between the active material layer and the collector and unproved in electrode performance.

<Examination of Surfactant>

Example 41 and Example 42

Example 41 is similar to Example 10 except that an Si—C granulated body (Si:artificial graphite=29:71 mass %) was used as the active material, and, as the skeleton-forming agent, the solid content concentration of $Na_2O.nSiO_2$ was adjusted to 6 mass %, the value of n to 2.5, and the skeleton density to 0.84 mg/cm².

Example 42 is similar to Example 41 except that, as the skeleton-forming agent, a nonionic surfactant (registered trademark: Triton X-100) was added by 0.05 mass %.

Figure 9:
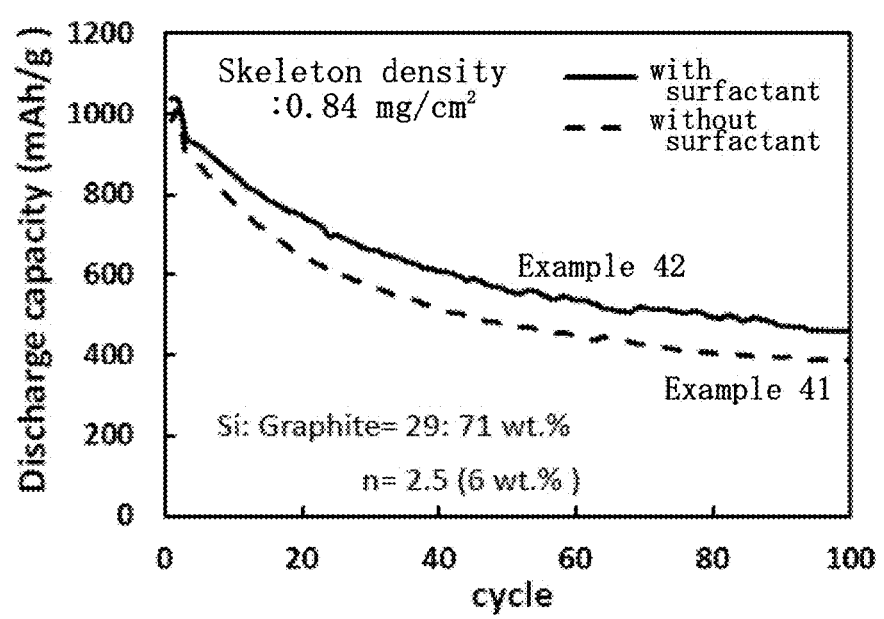
FIG. 9 is a view showing the cycle life characteristics of an electrode using a skeleton-forming agent including a surfactant according to an embodiment of the present invention.

FIG. 9 is a graph showing the cycle life characteristics of the electrode having no surfactant added to the skeleton-forming agent (Example 41) and the electrode having a surfactant added to the skeleton-forming agent (Example 42) in comparison. As is evident from FIG. 9, the cycle life characteristics improve by adding a surfactant. This is because the lyophilicity of the skeleton-forming agent to the active material layer improves with the surfactant, succeeding in formation of a uniform skeleton in the active material layer. While the nonionic surfactant is used as the surfactant in this embodiment, the present invention is not limited to this, but an anionic surfactant, a cationic surfactant, an ampholytic surfactant, or a nonionic surfactant may be used.

<Nail Penetration Safety>

Example 43 and Comparative Example 4

The safety of the battery adopting the negative electrode using the skeleton-forming agent was tested. As the test method, the nail penetration test was performed in which a nail was allowed to penetrate a battery model, to examine the state of smoking and firing of the battery model. For the test, used was a 1.1 Ah battery model in winch the negative electrode, the separator, and the positive electrode were stacked forming a plurality of layers in an aluminum laminate casing and an electrolytic solution was sealed therein. The positive electrode (4.2 mAh/cm²) was manufactured by coating aluminum foil (20 μm) with slurry made of $LiNi_{0.33}Co_{0.33}Mu_{0.33}O_2$, AB, and PVdF and regulating the pressure, and then performing heal treatment at 160° C. The negative electrode (4.6 mAh/cm²) was manufactured by coating copper foil (10 μm) with slurry made of artificial graphite ($D_{50}$=20 μm). AB, and an acrylic binder and regulating the pressure, and then performing heat treatment at 160° C.

Figure 2:
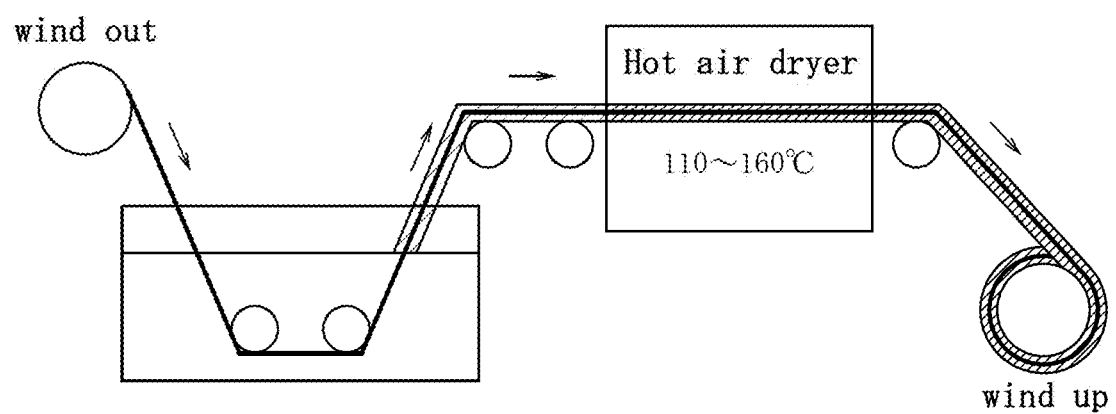
FIG. 2 is a view showing an example of coating with a skeleton-forming agent according to an embodiment of the present invention.

In Example 43, as shown in FIG. 2, the negative electrode was immersed in an aqueous solution with the skeleton-forming agent dissolved therein and then heat-treated at 150° C. As the skeleton-forming agent, used was an aqueous solution containing $Na_2O.3SiO_2$ and a nonionic surfactant (registered trademark: Triton X-100) in which the solid content concentration of $Na_2O.3SiO_2$ was 6 mass % and the solid content concentration of the surfactant was 0.05 mass %. The skeleton density of the electrode is 0.9 mg/cm² for a single side. In this test, since the positive electrode and the negative electrode are subjected to both-sided coating, the skeleton density for both sides is 1.8 mg/cm². A battery using a negative electrode uncoated with the skeleton-forming agent was used as Comparative Example 4.

As the electrolytic solution, used was 1 M $LiPF_6$/ethylene carbonate (EC):diethyl carbonate (DEC)=50:50 vol %+1 mass % of vinylene carbonate. As the separator, a polypropylene (PP) microporous membrane (23 μm) was used. In the nail penetration test, this battery model was charged at 0.1 C-rate up to 4.2 V, then an iron nail (φ3 mm, round) was allowed to penetrate through the battery at the center thereof at a speed of 1 mm/sec under the environment of 25° C., and the battery voltage, the nail temperature, and the casing temperature were measured.

In the conventional battery model using the electrode having no skeleton-forming agent (Comparative Example 4), when the nail penetration was performed, the battery voltage reduced down to 0 V and a large amount of smoke was generated. This is because the separator melted down due to heat generation accompanying occurrence of short-circuiting inside the battery model.

By contrast, in the battery model using the graphite negative electrode having the skeleton-forming agent (Example 43), when the nail penetration was performed, the voltage of 3 V or more was maintained, no smoking was generated, and the temperatures of the casing and the nail were 50° C. or less, hardly causing heat generation accompanying short-circuiting. This is considered because the skeleton present inside the active material layer of the negative electrode, coating the active material, etc., blocks migration of elections and thus prevents or reduces short-circuiting.

<Electrode Peel Test>

Example 43 and Comparative Example 4

Figure 16:
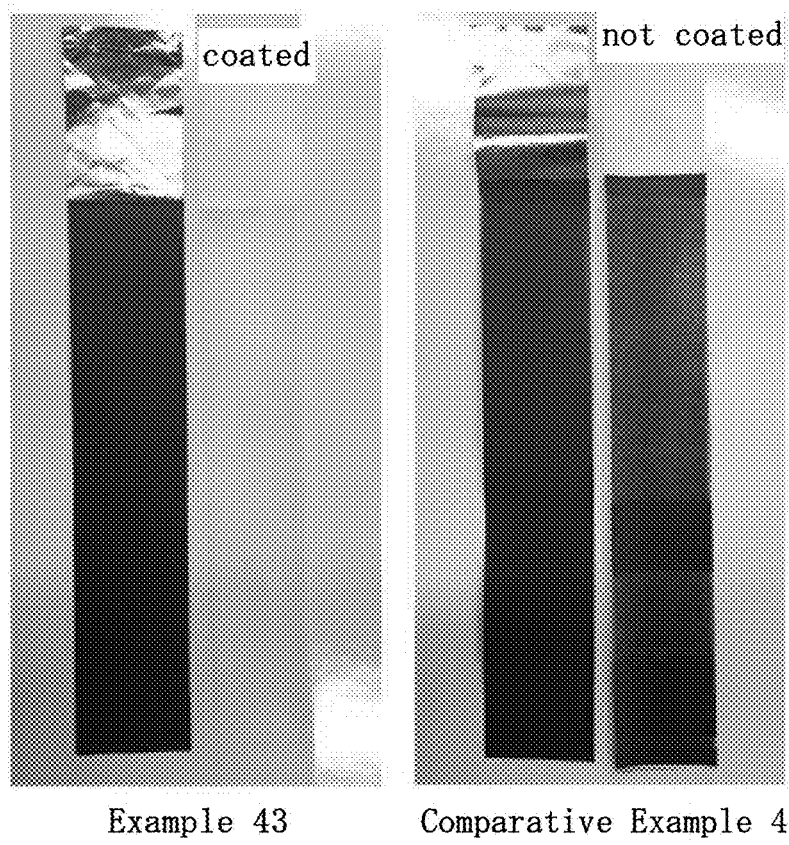
FIG. 16 includes views showing the results of a peel test comparing an electrode coated with a skeleton-forming agent to an uncoated electrode according to an embodiment of the present invention.
Figure 17:
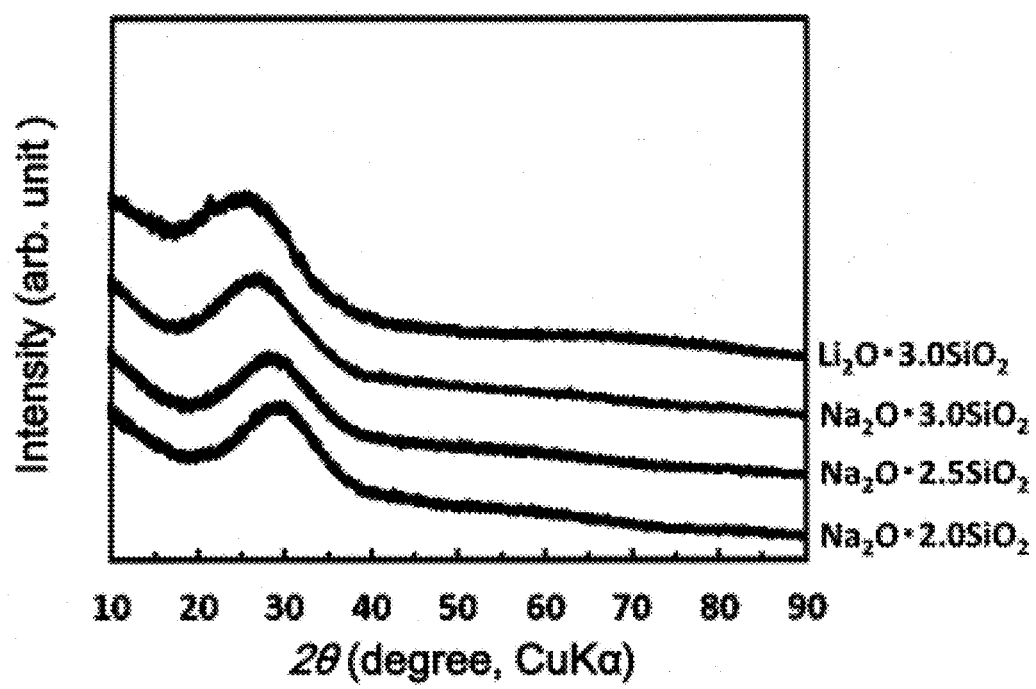
FIG. 17 is a view showing X-ray diffraction (XRD) patterns of silicate (Na$_2$O.nSiO$_2$) powder

A peel test was performed for the negative electrodes used for the batteries in Example 43 and Comparative Example 4. In the peel test, conforming to JIS K685, an adhesive tape (Scotch, No. 845, Book Tape) was pressure-bonded to the active material layer of the negative electrode with a 1 kg roller, and peeling was evaluated under the conditions of a tension rate of 300 mm/min and an angle of 180° in the environment of 25° C. FIG. 16 shows photographs of the negative electrodes and the adhesive tapes in Example 43 and Comparative Example 4 after the peel test. As is evident from FIG. 16, while the active material layer having peeled off adheres to the adhesive tape for the case of the negative electrode using no skeleton-forming agent in Comparative Example 4, the active material layer little adheres to the adhesive (ape for the negative electrode using the skeleton-forming agent in Example 43, exhibiting improvement in peel strength.

<Examination of Negative Electrode Active Material>

Examples 44 to 59 and Comparative Examples 5 to 20

Using various negative electrode active materials shown in Table 4, the effects with the presence/absence of the skeleton-forming agent were compared. Examples 44 to 59 were manufactured by: coating copper foil (10 μm) with slurry made of any of the negative electrode active materials shown in Table 4, AB, and PVdF and regulating the pressure; coating and impregnating the active material layer with the skeleton-forming agent with a spray gun; and performing heat treatment at 160° C. The solid content ratio of the electrode slurry was 88 mass % of the electrode active material, 4 mass % of AB, and 8 mass % of PVdF.

As the skeleton-forming agent, used was an aqueous solution containing $Li_{0.05}Na_{1.95}O.3SiO_2$ and a nonionic surfactant (registered trademark: Triton X-100) in which the solid content concentration of $Li_{0.05}Na_{1.95}O.3SiO_2$ was 7.5 mass % and the solid content concentration of the surfactant was 0.03 mass %. In this test, the test electrode was subjected to single-sided coating.

As the test battery, used was 1 M $LiPF_6$/ethylene carbonate (EC):diethyl carbonate (DEC)=50:50 vol %+1 mass % of vinylene carbonate. As the separator, a polypropylene (PP/PE/PP) three-layer microporous membrane (25 μm) was used. A charge/discharge test was performed at a current density of 0.1 $mA/cm^2$ and a test environment temperature of 30° C. The cutoff potential, the active material density of the electrode (single side), the electrode thickness, and the skeleton density (single side) are as shown in Table 4.

Table 5 is a table showing the results of a cycle life characteristics test for the electrodes having skeleton formation (Examples 44 to 59). Table 6 is a table showing the results of the cycle life characteristics test for electrodes having no skeleton formation for comparison (Comparative Examples 5 to 20). As is evident from comparison between Table 5 and Table 6, the electrodes using Si, SiO, Ge, In, and $Fe_2O_3$ as the active material exhibited excellent cycle life characteristics by using the skeleton-forming agent. Among others, the electrodes using Si as the active material (Example 56 and Comparative Example 17) exhibited an especially significant difference. This is considered because, with establishment of the robust skeleton-forming agent in the active material layer, destruction of the electron conductive network occurring along with a volume change was prevented or reduced.

By contrast, when using Ag, $Ag_2O$, Sb, $Sb_2S_3$, $SnO_2$, CuO, NiO, artificial graphite, and hard carbon, no large difference was observed in cycle life characteristics with the presence/absence of the skeleton-forming agent. It is considered that, since these active materials are small in volume change compared to Si, SiO, Ge, In, and $Fe_2O_3$, no definite difference was exhibited under the conditions of tins test.

In Sn, however, the cycle life characteristics were worsened using the skeleton-forming agent. This is considered because Sn was high in dissolution rate compared to the skeleton-forming agent and unable to maintain the shape of the active material, whereby the capacity was reduced.

TABLE 4

| Active material | Active material density ($mg/cm^2$) | Cutoff potential (vs. $Li^+$/Li) | Electrode thickness (μm) | Skeleton density ($mg/cm^2$) |
|---|---|---|---|---|
| Sn | 2.6 | 0.01~1.80 | 27 | 0.52 |
| SnO | 2.3 | 0.01~1.80 | 46 | 0.28 |
| $SnO_2$ | 2.4 | 0.01~1.80 | 27 | 0.47 |
| Ge | 2.2 | 0.01~1.40 | 37 | 0.59 |
| Ag | 2.2 | 0.01~1.00 | 37 | 0.62 |
| $Ag_2O$ | 2.1 | 0.01~1.00 | 38 | 0.69 |
| Sb | 1.9 | 2.00~0.50 | 41 | 0.98 |
| $Sb_2S_3$ | 2.4 | 2.00~0.50 | 44 | 0.49 |
| In | 2.1 | 0.01~1.50 | 33 | 0.74 |
| CuO | 3.2 | 0.01~3.00 | 34 | 0.30 |
| $Fe_2O_3$ | 2.7 | 0.01~3.00 | 34 | 1.06 |
| NiO | 4.2 | 0.01~3.00 | 39 | 0.73 |
| Si | 1.1 | 0.01~1.40 | 25 | 0.47 |
| SiO | 18 | 0.01~1.40 | 31 | 0.48 |
| Artificial graphite | 4.5 | 0.01~0.80 | 64 | 0.70 |
| Hard carbon | 5.3 | 0.00~1.00 | 76 | 0.40 |

TABLE 5

| | | Discharge capacity of active material (mAh/g) | | |
|---|---|---|---|---|
| Experimental example | Active material | 1 cycle | 2 cycle | 10 cycle |
| Example 44 | Sn | 378.9 | 44.9 | 8.0 |
| Example 45 | SnO | 661.2 | 489.8 | 178.9 |
| Example 46 | $SnO_2$ | 893.5 | 850.9 | 708.9 |
| Example 47 | Ge | 460.7 | 556.42 | 558.7 |
| Example 48 | Ag | 140.8 | 139.6 | 34.8 |
| Example 49 | $Ag_2O$ | 253.3 | 263.0 | 233.9 |
| Example 50 | Sb | 68.6 | 39.3 | 39.5 |
| Example 51 | $Sb_2S_3$ | 384.6 | 348.1 | 275.0 |
| Example 52 | In | 325.4 | 146.4 | 52.6 |
| Example 53 | CuO | 328.7 | 254.0 | 206.6 |
| Example 54 | $Fe_2O_3$ | 989.8 | 948.6 | 846.2 |

TABLE 5-continued

| Experimental example | Active material | Discharge capacity of active material (mAh/g) | | |
| --- | --- | --- | --- | --- |
| | | 1 cycle | 2 cycle | 10 cycle |
| Example 55 | NiO | 630.7 | 563.6 | 471.1 |
| Example 56 | Si | 2718.5 | 2670.1 | 2573.5 |
| Example 57 | SiO | 809.9 | 607.0 | 226.8 |
| Example 58 | Artificial graphite | 331.2 | 334.5 | 336.4 |
| Example 59 | Hard carbon | 220.9 | 212.5 | 212.5 |

TABLE 6

| Experimental example | Active material | Discharge capacity of active material (mAh/g) | | |
| --- | --- | --- | --- | --- |
| | | 1 cycle | 10 cycle | 10 cycle |
| Comparative Example 5 | Sn | 446.7 | 247.9 | 6.9 |
| Comparative Example 6 | SnO | 765.0 | 654.6 | 250.8 |
| Comparative Example 7 | $SnO_2$ | 732.0 | 620.3 | 430.5 |
| Comparative Example 8 | Ge | 527.6 | 284.8 | 80.0 |
| Comparative Example 9 | Ag | 125.2 | 124.2 | 37.6 |
| Comparative Example 10 | $Ag_2O$ | 234.0 | 257.6 | 251.0 |
| Comparative Example 11 | Sb | 178.2 | 29.4 | 25.3 |
| Comparative Example 12 | $Sb_2S_3$ | 410.7 | 378.9 | 293.9 |
| Comparative Example 13 | In | 48.2 | 36.2 | 25.3 |
| Comparative Example 14 | CuO | 266.9 | 214.8 | 124.7 |
| Comparative Example 15 | $Fe_2O_3$ | 805.8 | 330.3 | 123.1 |
| Comparative Example 16 | NiO | 608.0 | 557.3 | 473.3 |
| Comparative Example 17 | Si | 56 | 4.9 | 2.5 |
| Comparative Example 18 | SiO | 836.1 | 519.0 | 14.1 |
| Comparative Example 19 | Artificial graphite | 322.5 | 324.7 | 326.1 |
| Comparative Example 20 | Hard carbon | 228.1 | 219.1 | 210.7 |

<Examination of Si and Graphite Blend Ratio>

Examples 60 to 63 and Comparative Examples 21 to 24

The presence absence of the effects of the skeleton formation were compared among electrodes using a mixture of Si (1 μm) and artificial graphite (19 μm) as the negative electrode active material. Examples 60 to 63 were manufactured by: coating copper foil (10 μm) with slurry made of the negative electrode active materials shown in Table 7, AB, and PVdF and regulating the pressure; coating and impregnating the active material layer with the skeleton-forming agent with a spray gun; and performing heat treatment at 160° C.

For comparison, electrodes that were not coated or impregnated with the skeleton-forming agent were manufactured (Comparative Examples 21 to 24). The solid content ratio of the electrode slurry was 88 mass % of the electrode active material, 4 mass % of AB, and 8 mass % of PVdF. As the skeleton-forming agent used was an aqueous solution containing $Li_{0.05}Na_{1.95}O \cdot 3SiO_2$ and a nonionic surfactant (registered trademark: Triton X-100) in winch the solid content concentration of $Li_{0.05}Na_{1.95}O \cdot 3SiO_2$ was 7.5 mass % and the solid content concentration of the surfactant was 0.03 mass %. In this test, the test electrode was subjected to single-sided coating.

As the test battery, used was 1 M $LiPF_6$/ethylene carbonate (EC):diethyl carbonate (DEC)=50:50 vol %+1 mass % of vinylene carbonate. As the separator, a polypropylene (PP/PE/PP) three-layer microporous membrane (25 μm) was used. A charge/discharge test was performed at a current density of 0.1 C-rate, a test environment temperature of 30° C., and a cutoff potential of 0.0 to 1.4 V (vs. $Li^+$/Li). The skeleton density (single side) is as shown in Table 8. The capacity density of the test electrodes was set to 3.0 mAh/$cm^2$.

Figure 10:
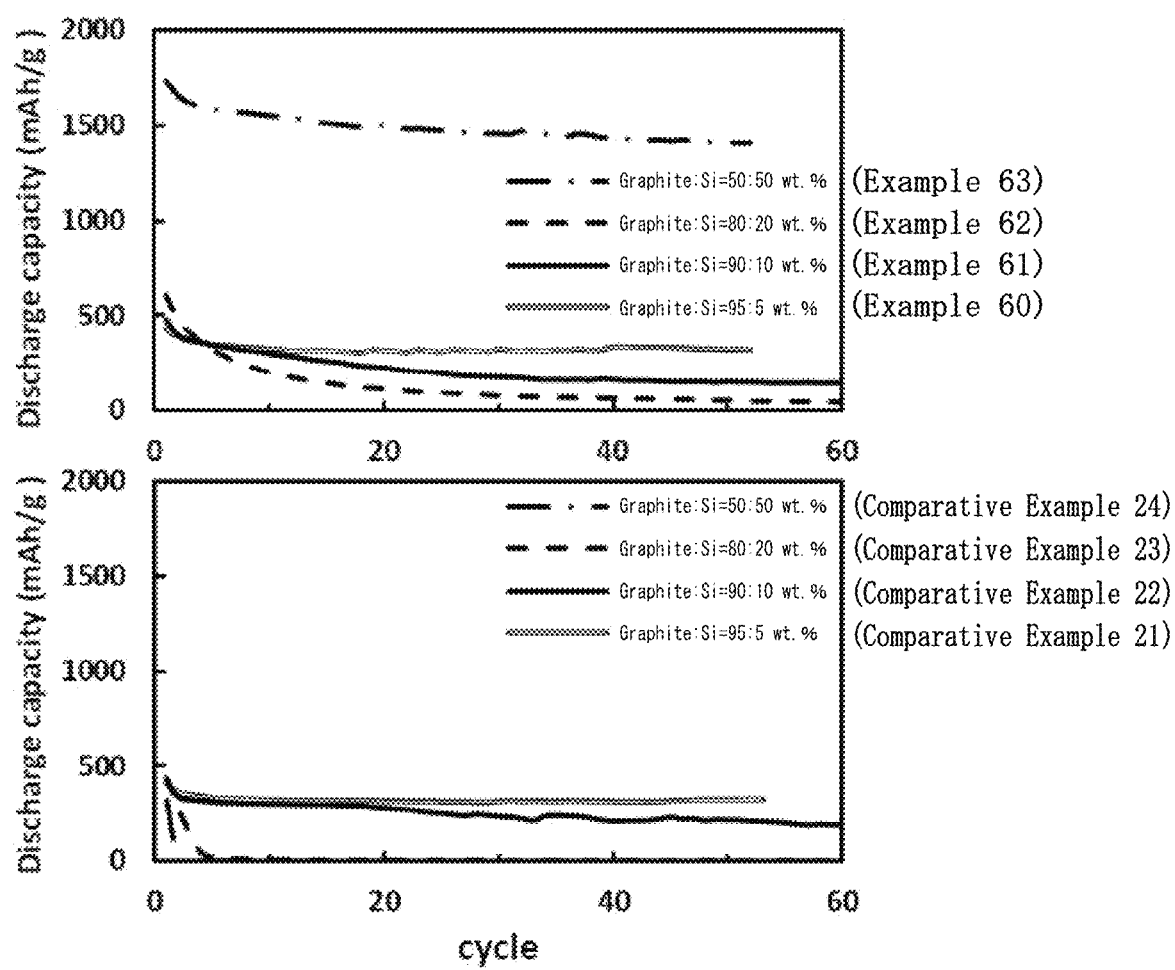
FIG. 10 includes views comparing electrodes coated with a skeleton-forming agent to uncoated electrodes according to an embodiment of the present invention.
Figure 11:
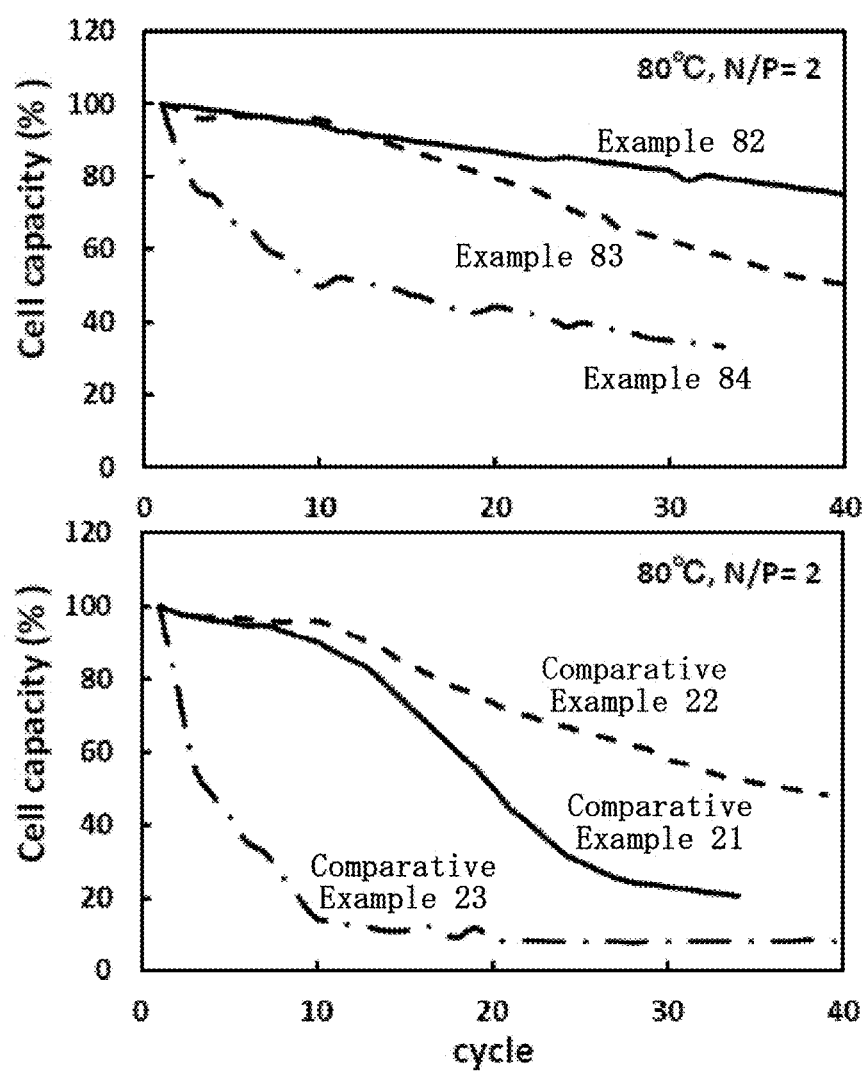
FIG. 11 includes views comparing electrodes coated with a skeleton-forming agent to uncoated electrodes according to an embodiment of the present invention.

FIG. 10 includes graphs showing, in comparison, the cycle life characteristics of Examples 60 to 63 coated with the skeleton-forming agent and Comparative Examples 21 to 24 uncoated with the skeleton-forming agent. As is evident from FIG. 10, so large change was not observed for the electrodes having an Si amount less than or equal to 10 mass % with respect to the total amount of the active material included in the negative electrode being 100 mass % (Example 60, Example 61, Comparative Example 21, and Comparative Example 22). However, the life characteristics were evidently improved for the electrodes having an Si amount greater than or equal to 20 mass % (Example 62, Example 63, Comparative Example 23, and Comparative Example 24). In particular, for the electrodes having an Si amount of 50 mass % (Example 63 and Comparative Example 24), an overwhelming effect of improving the life characteristics was exhibited by skeleton formation.

TABLE 7

| | Blend ratio of active material (mass %) | |
| --- | --- | --- |
| Experimental example | Artificial graphite | Si |
| Example 60 | 95 | 5 |
| Example 61 | 10 | 10 |
| Example 62 | 80 | 20 |
| Example 63 | 50 | 50 |
| Comparative Example 21 | 95 | 5 |
| Comparative Example 22 | 90 | 10 |
| Comparative Example 23 | 80 | 20 |
| Comparative Example 24 | 50 | 50 |

TABLE 8

| Experimental example | Skeleton density (mg/$cm^2$) |
| --- | --- |
| Example 60 | 0.32 |
| Example 61 | 0.43 |
| Example 62 | 0.53 |
| Example 63 | 0.74 |
| Comparative Example 21 | — |
| Comparative Example 22 | — |
| Comparative Example 23 | — |
| Comparative Example 24 | — |

5. ADVANTAGEOUS EFFECT OF THIS EMBODIMENT

According to this embodiment described above, the following advantageous effects are obtained.

By using the skeleton-forming agent including $A_2O \cdot 3SiO_2$ (A=Na, Li) for the electrode, it is possible to obtain an electrode having excellent heat resistance, high strength, and improved cycle life characteristics. Without the necessity of a tough collector, occurrence of creases and cracks on the collector can be prevented or reduced. It is unnecessary to use a binder large in irreversible capacity. Even if the election conductivity of the active material layer is high, heat generation due to internal short-circuiting can be reduced. Since having heat resistance against a temperature exceeding 1000° C., the skeleton-forming agent is not carbonated. Even an electrode including an alloy-based material having sharp volume change and a binder low in bonding strength can obtain good life characteristics. Expansion of the active material layer is small even coming into contact with a high-temperature electrolytic solution.

Second Embodiment

1. CONFIGURATION OF SKELETON-FORMING AGENT AND ELECTRODE

Figure 12:
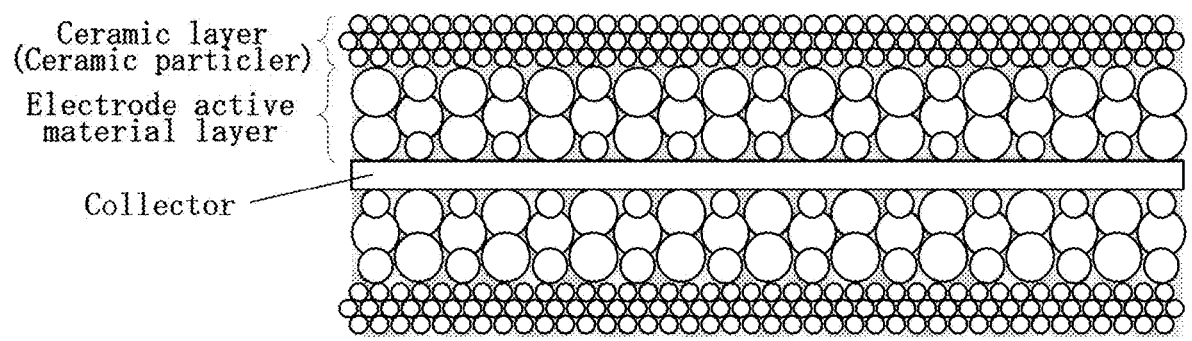
FIG. 12 is a view showing a cross section of an electrode coated with a skeleton-forming agent containing inorganic particles according to an embodiment of the present invention.

Next, the second embodiment of the present invention will be described. The second embodiment is mainly different from the first embodiment in that ceramic is included in the skeleton-forming agent. FIG. 12 shows a cross-sectional image of the electrode of the second embodiment, in winch the skeleton-forming agent of the second embodiment includes ceramic powder or powder of a solid electrolyte excellent in alkali resistance.

Figure 3:
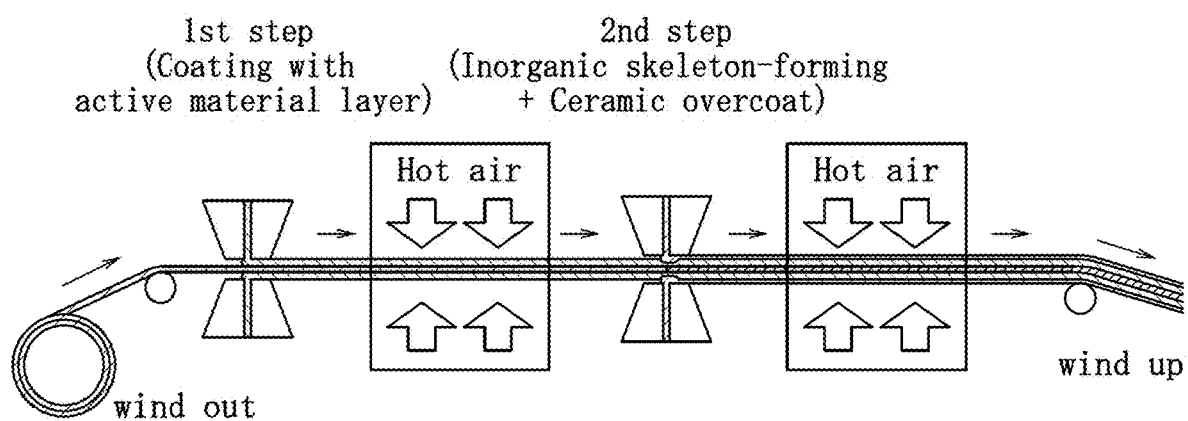
FIG. 3 is a view showing an example of manufacturing processes for an electrode according to an embodiment of the present invention.

FIG. 3 shows an example of the manufacturing process, in which the surface of the electrode body is coated with the skeleton-forming agent of the second embodiment, whereby alumina in the skeleton-forming agent is accumulated on the surface of the active material layer, forming an electrically insulated ceramic layer or solid electrolyte layer, and also the skeleton-forming agent permeates into the active material layer.

By the above process, a robust skeleton can be formed, and occurrence of peeling and cracking during drying can be prevented or reduced. Also, holes are formed from gaps between inorganic particles, imparting good lyophilicity with the electrolytic solution. Moreover, the ceramic layer serves as the separator, making it possible to constitute a battery without use of a separator separately.

2. EXAMPLES

Examples in the second embodiment in which the composition of the skeleton-forming agent was changed variously will be described.

[Examination of the Ratio of $Na_2O \cdot 3SiO_2$ to $\alpha\text{-}Al_2O_3$]

Examples 85 to 87 and Comparative Example 23

Table 9 shows the solid content compositions of the skeleton-forming agent used in Example 85 to 87. Also, an electrode using polyimide (PI) as the skeleton-forming agent was manufactured (Comparative Example 23). As $\alpha\text{-}Al_2O_3$, powder having a median diameter ($D_{50}$) of 0.95 μm as measured by the laser diffraction/scattering particle diameter distribution measurement was used. The solid content concentration of the skeleton-forming agent was set to 10 mass % when the solid content of $Na_2O \cdot 3SiO_2$ and $\alpha\text{-}Al_2O_3$ was 100 mass %.

TABLE 9

| Experimental example | Solid content composition of skeleton-forming agent (mass %) | | |
|---|---|---|---|
| | $Na_2O \cdot 3SiO_2$ | $\alpha\text{-}Al_2O_3$ | PI |
| Example 85 | 90 | 10 | — |
| Example 86 | 80 | 20 | — |
| Example 87 | 50 | 50 | — |
| Comparative Example 23 | — | — | 100 |

The negative electrode (4.0 mAh/cm²) was manufactured by: coating copper foil (10 μm) with slurry made of SiO, carbon black (CB), and an acrylic binder and regulating the pressure; coating and impregnating the active material layer with the skeleton-forming agent shown in Table 9 with a spray gun; and performing heat treatment at 160° C. The skeleton density of the electrode is 3.0 mg/cm² for a single side. The solid content ratio of the negative electrode slurry was 90 mass % of SiO, 5 mass % of CB, and 5 mass % of Ihe acrylic binder. Note that the negative electrode had undergone electrochemical compensation of Li equivalent to the irreversible capacity.

The positive electrode (2.0 mAh/cm²) was manufactured by coating aluminum foil (20 μm) with slurry made of $LiFePO_4$, CB, and an acrylic binder and regulating the pressure, and then performing heat treatment at 160° C. The solid content ratio of the positive electrode slurry was 91 mass % of $LiFePO_4$, 5 mass % of CB, and 4 mass % of the acrylic binder. For the test battery, as the electrolytic solution, used was 1 M $LiPF_6$/ethylene carbonate (EC):diethyl carbonate (DEC)=50:50 vol %+1 mass % of viuylene carbonate.

Note that no separator was used in this test. A charge/discharge test was performed at a test environment temperature of 60° C. and a current density of 0.1 C-rate. The cutoff potential was 4.0 V to 2.5 V.

Figure 13:
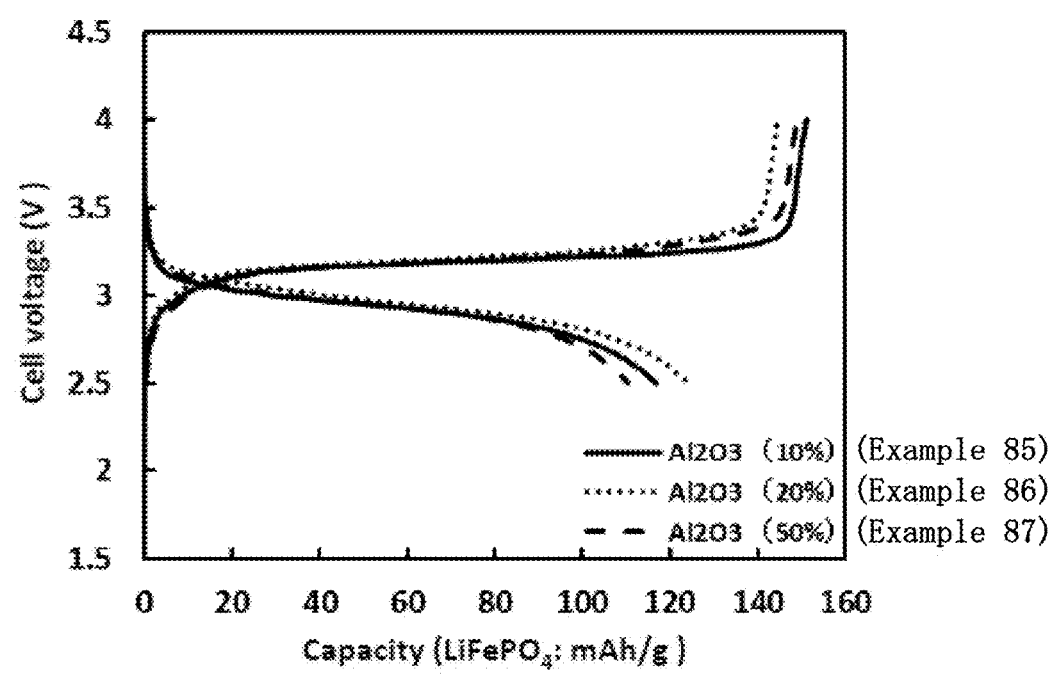
FIG. 13 is a view showing initial charge/discharge curves of batteries using no separator according to an embodiment of the present invention.

FIG. 13 shows initial charge discharge curves of test batteries of Examples 85 to 87. It is found that the batteries function without a separator. No battery test was performed for Comparative Example 23. The reason is that, since the active material layer was coated with PI, the electrode resistance increased, failing to electrochemically dope the active material layer with Li ions.

<Examination of Particle Diameter of Alkali-Resistant Ceramic Particles>

The surface of the electrode body was coated with the skeleton-forming agent including $\alpha\text{-}Al_2O_3$ of which the particle diameter was changed as shown in Table 10 and dried, and the coating properties, lyophilicity binding properties, foamed state, aggregated stale, and precipitated state of the resultant electrodes were observed. As the skeleton-forming agent, an aqueous solution of $Li_{0.05}Na_{1.95}O \cdot 3SiO_2$ and $\alpha\text{-}Al_2O_3$ was used. The solid content concentration of the skeleton-forming agent was 25 mass % when the solid content of $Li_{0.05}Na_{1.95}O \cdot 3SiO_2$ and $\alpha\text{-}Al_2O_3$ was 100 mass %. Note that the particle diameter of inorganic particles shown in Table 10 is the median diameter ($D_{50}$) by the laser diffraction/scattering particle diameter distribution measurement. As shown in Table 10, it is found that the particle diameter of ceramic particles is preferably in the range of 0.2 to 20 μm in the second embodiment.

TABLE 10

| Particle diameter of inorganic particles | Coating properties | Lyophilicity | Binding properties | Foamed state | Aggregated state | Precipitated state |
|---|---|---|---|---|---|---|
| less than 0.2 μm | ⊙ | X | X | X | ○ | ⊙ |
| 0.2 μm or greater less than 1 μm | ⊙ | ○ | ○ | ○ | ○ | ⊙ |

TABLE 10-continued

| Particle diameter of inorganic particles | Coating properties | Lyophilicity | Binding properties | Foamed state | Aggregated state | Precipitated state |
|---|---|---|---|---|---|---|
| 1 μm or greater less than 10 μm | ⊙ | ⊙ | ○ | ⊙ | ⊙ | ⊙ |
| 10 μm or greater less than 50 μm | ⊙ | ⊙ | ⊙ | ⊙ | ⊙ | ○ |
| 50 μm or greater 100 μm or less | ○ | ⊙ | ⊙ | ⊙ | ⊙ | ○ |
| 100 μm or greater 200 μm or less | ○ | ⊙ | ⊙ | ⊙ | ⊙ | X |
| over 200 μm | X | ⊙ | ⊙ | ⊙ | ⊙ | X |

Coating properties: ⊙very good ○good Xuneven
Lyophilicity: ⊙very good ○good Xhardly lyophilic
Binding properties: ⊙very good ○good Xeasily peel off from collector
Foamed state: ⊙None ○small foam observed Xlarge foam observed
Aggregated state: ⊙hardly aggregate ○normal Xeasily aggregate
Precipitated state: ⊙slow ○normal Xfast

3. ADVANTAGEOUS EFFECTS OF THIS EMBODIMENT

According to this embodiment, the following advantageous effects are obtained.

By coating the electrode surface with the skeleton-forming agent used in the first embodiment and powder ($D_{50}$=0.2 to 20 μm) excellent in alkali resistance, a robust skeleton can be formed in the active material layer, and also occurrence of peeling and cracking during drying can be prevented or reduced. Holes are formed from gaps between inorganic particles, imparting good lyophilicity with the electrolytic solution. The ceramic layer serves as the separator, making it possible to constitute a battery without use of a separator separately.

Other Embodiments

<Skeleton Formation of Active Material Granulated Body>

Examples 88 to 93

A test on the production method for a Si granulated body having the skeleton-forming agent was performed.

A Si granulated body was produced by spray-drying a suspension containing Si ($D_{50}$=1 μm), AB, VGCF, and PI under the conditions of a liquid feeding rate of 5 g/min, a spray pressure of 0.1 MPa, and a drying temperature of 80 to 180° C., to obtain $D_{50}$=5 to 8 μm. The solid content ratio of the suspension is as shown in Table 11.

Thereafter, the Si granulated body having the skeleton-forming agent was produced by transferring the granulated body obtained by spray drying to a fluid bed, to coat the granulated body with particles using the skeleton-forming agent ($Li_{0.2}Na_{1.8}O \cdot nSiO_2$) adjusted to have a solid content concentration of 0.5 mass %. The skeleton-forming agent was adjusted to be 1 mass % with respect to the total of the granulated body obtained by spray drying and the skeleton-forming agent being 100 mass %.

Figure 14:
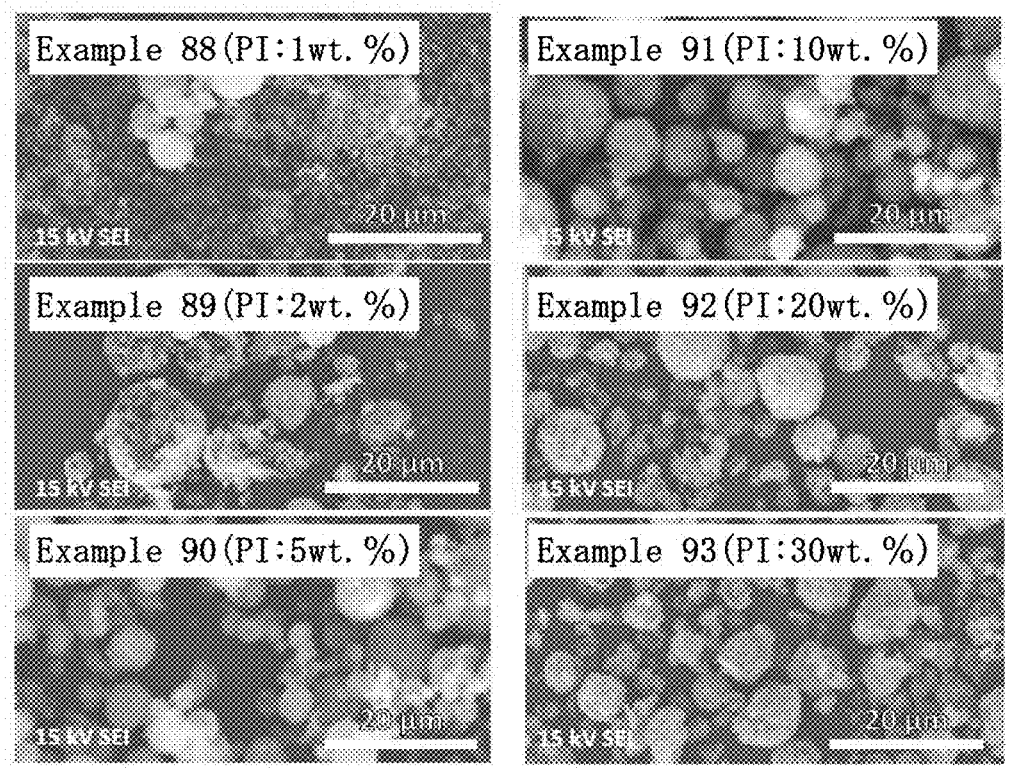
FIG. 14 shows SEM images of Si granulated bodies adopting a skeleton-forming agent according to an embodiment of the present invention.

FIG. 14 shows SEM images of Si granulated bodies having the resultant skeleton-forming agent (Examples 88 to 93). It has been found that, in Example 88, since the amount of PI contained in the suspension is small, it is difficult to obtain a spherically granulated body, but, as the PI amount increases, a spherically granulated body becomes easily obtainable. It has also been found that, by adding fiber-shaped particles like VGCF, an echinus-shaped granulated body tends to be formed.

TABLE 11

| | Solid content composition of suspension (mass %) | | | |
|---|---|---|---|---|
| Experimental example | Si | AB | VGCF | PI |
| Example 88 | 97 | 1 | 1 | 1 |
| Example 89 | 96 | 1 | 1 | 2 |
| Example 90 | 93 | 1 | 1 | 5 |
| Example 91 | 88 | 1 | 1 | 10 |
| Example 92 | 78 | 1 | 1 | 20 |
| Example 93 | 68 | 1 | 1 | 30 |

Aluminum Phosphate-Based Skeleton-Forming Agent (Example 94)

The test electrode (4.0 mAh/cm²) was manufactured by: coating copper foil (40 μm) with slurry made of Si (1 μm), CB, and a PVdF binder and regulating the pressure: coating and impregnating the active material layer with the skeleton-forming agent with a spray gun; and performing heat treatment at 300° C. As the skeleton-forming agent, aluminum phosphate ($Al_2O_3 \cdot 3P_2O_5$) was dissolved in water and adjusted to have a solid content of 5 mass %. The skeleton density of the electrode is 2.0 mg/cm² for a single side. The solid content ratio of die negative electrode slimy was 90 mass % of Si, 4 mass % of CB, and 8 mass % of the PVdF binder.

Figure 15:
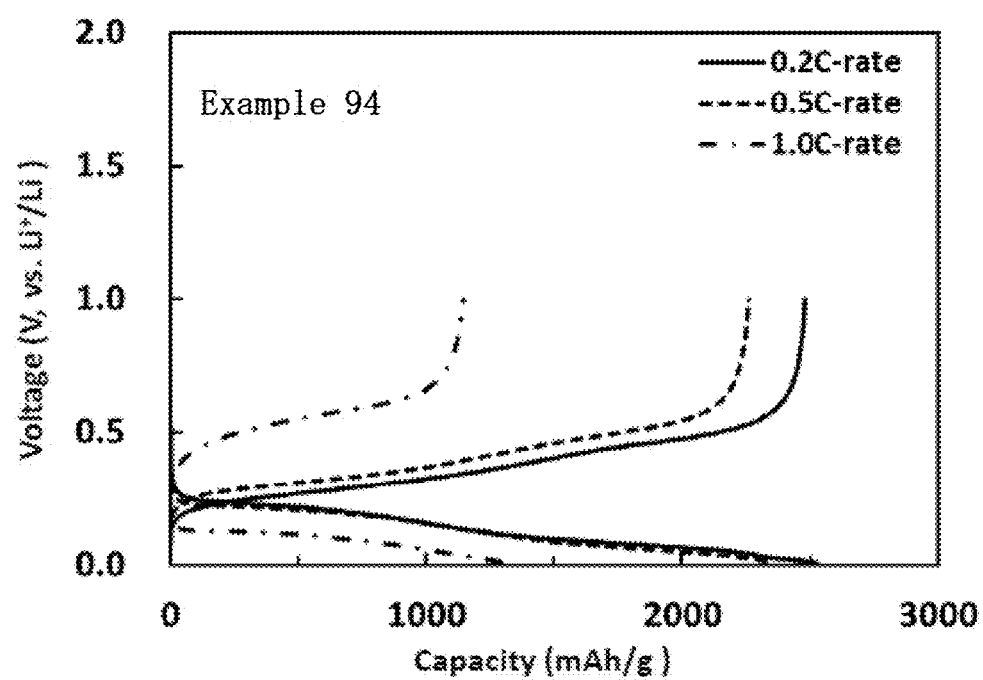
FIG. 15 is a view showing charge/discharge curves at different rates according to an embodiment of the present invention.

For the test battery, metal Li was used as the counter electrode. As the electrolytic solution, used was 1 M $LiPF_6$/ ethylene carbonate (EC):diethyl carbonate (DEC)=50:50 vol %+1 mass % of vinylene carbonate. As the separator, a glass nonwoven fabric (GA-100 manufactured by Toyo Rosin Kaisha, Ltd.) was used. In the charge/discharge test, charge/discharge was performed at a test environment temperature of 30° C. and at current densities of 0.1 C-rate, 0.5 C-rate, and 1.0 C-rate. The cuttoff potential was 1.0 V to 0.01 V. FIG. 15 shows charge/discharge curves at these rates in Example 94. It has been found that using aluminum phosphate ($Al_2O_3 \cdot 3P_2O_5$) as the skeleton-forming agent, also, a stable irreversible capacity is obtained.

<Evaluation as Binder>

Comparative Example 24

A test using the skeleton-forming agent as a binder was performed.
As the binder, an alkali metal silicate ($Li_{0.05}Na_{1.95}O.2.8SiO_2$) was adjusted so that the solid content concentration be 40 mass % by adding water. The test negative electrode (2 mAh/cm$^2$) was manufactured by coating copper foil (10 μm) with slurry made of Si ($D_{50}$=1 μm), carbon black, and an inorganic binder and performing heat treatment at 150° C. The solid content ratio of the electrode slurry was 19 mass % of Si, 4 mass % of CB, and 76 mass % of the binder.

Comparative Example 25

Comparative Example 25 was manufactured in a similar manner to Comparative Example 24 except that the binder was changed from the alkali metal silicate to an aluminum primary phosphate ($Al_2O_3.3P_2O_5$). Note that a commercially available reagent (produced by Aesar) was used as the aluminum phosphate.

Reference Example 1

As the binder, an alkali metal silicate ($Li_{0.05}Na_{1.95}O.2.8SiO_2$) and α-$Al_2O_3$ ($D_{50}$=3 μm) were mixed at a ratio of 50:50 mass %, and water was added to the mixture so that the solid content concentration of the mixture be 40 mass %. The other conditions are similar to those in Comparative Example 24.

Reference Example 2

As the binder, an aluminum phosphate ($Al_2O_3.3P_2O_5$) and α-$Al_2O_3$ ($D_{50}$=3 μm) were mixed at a ratio of 50:50 mass %, and water was added to the mixture so that the solid content concentration of the mixture be 40 mass %. The other conditions are similar to those in Comparative Example 25.

In Comparative Example 24, Si and the alkali metal silicate reacted with each other during mixing into slurry, causing generation of hydrogen gas and foaming of the slurry. Also, in Comparative Example 24 and Comparative Example 25, at temporary drying at 80° C., the active material layer expanded, failing to obtain a uniform electrode. Furthermore, in the heat treatment at 150° C. of the electrodes of Comparative Example 24 and Comparative Example 25, the volume of the active material layer greatly contracted, causing cracks in the active material layer and drop-off from the collector.

By contrast, in Reference Example 1, although Si and the alkali metal silicate reacted with each other during mixing into slurry, causing generation of hydrogen gas and foaming of the slurry, the active material layer did not expand at temporary drying at 80° C. Also, in the heat treatment at 150° C. of the electrode, the volume contraction was prevented or reduced, and the phenomena such as cracks in the active material layer and drop-off from the collector did not occur, compared to Comparative Example 24.

In Reference Example 2, no foaming of the shiny occurred because hydrogen gas was not generated during mixing into shiny, and the active material layer did not expand at temporary drying at 80° C. Also, in the heat treatment at 150° C. of the electrode, the phenomena such as cracks in the active material layer and drop-off from the collector did not occur, compared to Comparative Example 24.

The reason why the active material layer expanded at 80° C. in Comparative Example 24 and Comparative Example 25 is considered that vaporized gas (water vapor) was confined in the active material layer at the time of drying of the slimy, causing expansion of the active material layer. It is nuttier considered that, at 150° C., due to great volume contraction originating from the alkali metal silicate and the aluminum phosphate, cracks occurred in the active material layer and the active material layer dropped off from the collector.

By contrast, in Reference Example 1 and Reference Example 2, in which $Al_2O_3$ having no binding properties is included in the binder, it is considered that gas was emitted from between $Al_2O_3$ particles during electrode drying, preventing the active material layer from expanding. Further, it is considered that, at 150° C., $Al_2O_3$ prevented or reduced the volume contraction of the alkali metal silicate and the aluminum phosphate, preventing cracks of the active material layer and drop-off from the collector.

The above phenomena are the same as the following one, for example: when mochi (glutinous rice cake) is heated, it expands since water vapor inside is confined in the mochi, but cookies made of wheat flour as a main ingredient are resistant to such expansion as is seen in mochi since water vapor can escape from gaps of the flour.

The charge/discharge test was performed using the electrodes of Reference Example 1 and Reference Example 2. As the battery, manufactured was a half cell using 1 M $LiPF_6$/EC:DEC=50:50 vol %+VC (1 mass %) as the electrolytic solution, a layered structure of a polyolelin microporous membrane (20 μm) and a glass nonwoven fabric (GA-100) as the separator, and metal Li as the counter electrode. The charge/discharge test was performed at an environment temperature of 30° C., a current density of 0.25 C-rate, and a cutoff potential of 1.5 V to 0.01 V.

In comparison of the initial charge/discharge efficiency, the alkali metal silicate (Reference Example 1) was 71% and the aluminum phosphate was 67%, indicating that the alkali metal silicate exhibited better initial charge/discharge efficiency. This means that the alkali metal silicate is smaller in irreversible capacity than the aluminum phosphate.

Figure 18:
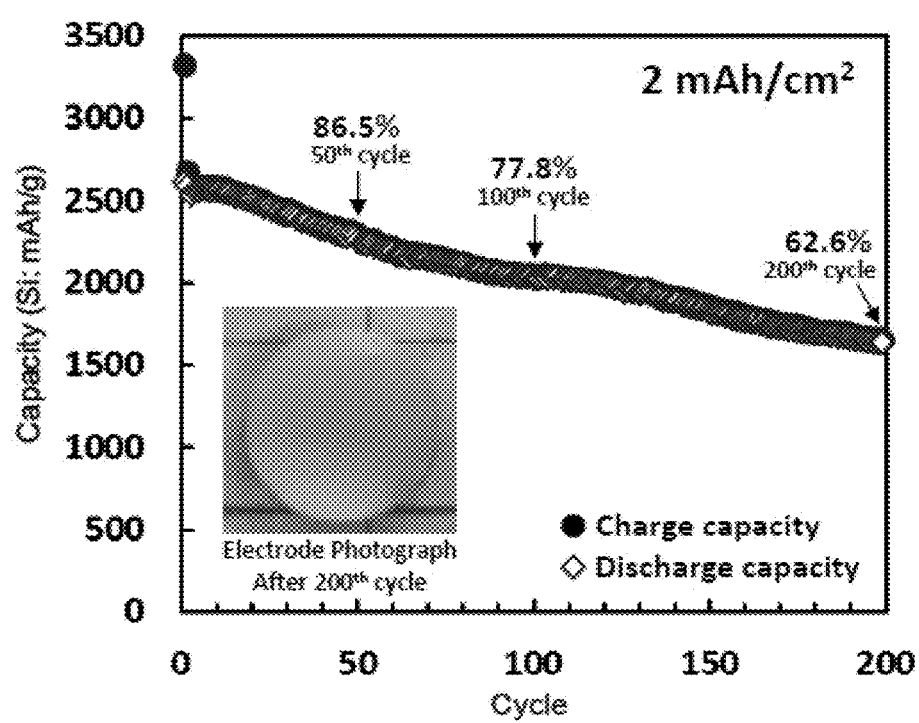
FIG. 18 is a view showing the cycle life characteristics of an electrode of a reference example including alkali metal silicate (Li$_{0.05}$Na$_{1.95}$O.2.8SiO$_2$) as a binder, together with the electrode after 200 cycles.
Figure 19:
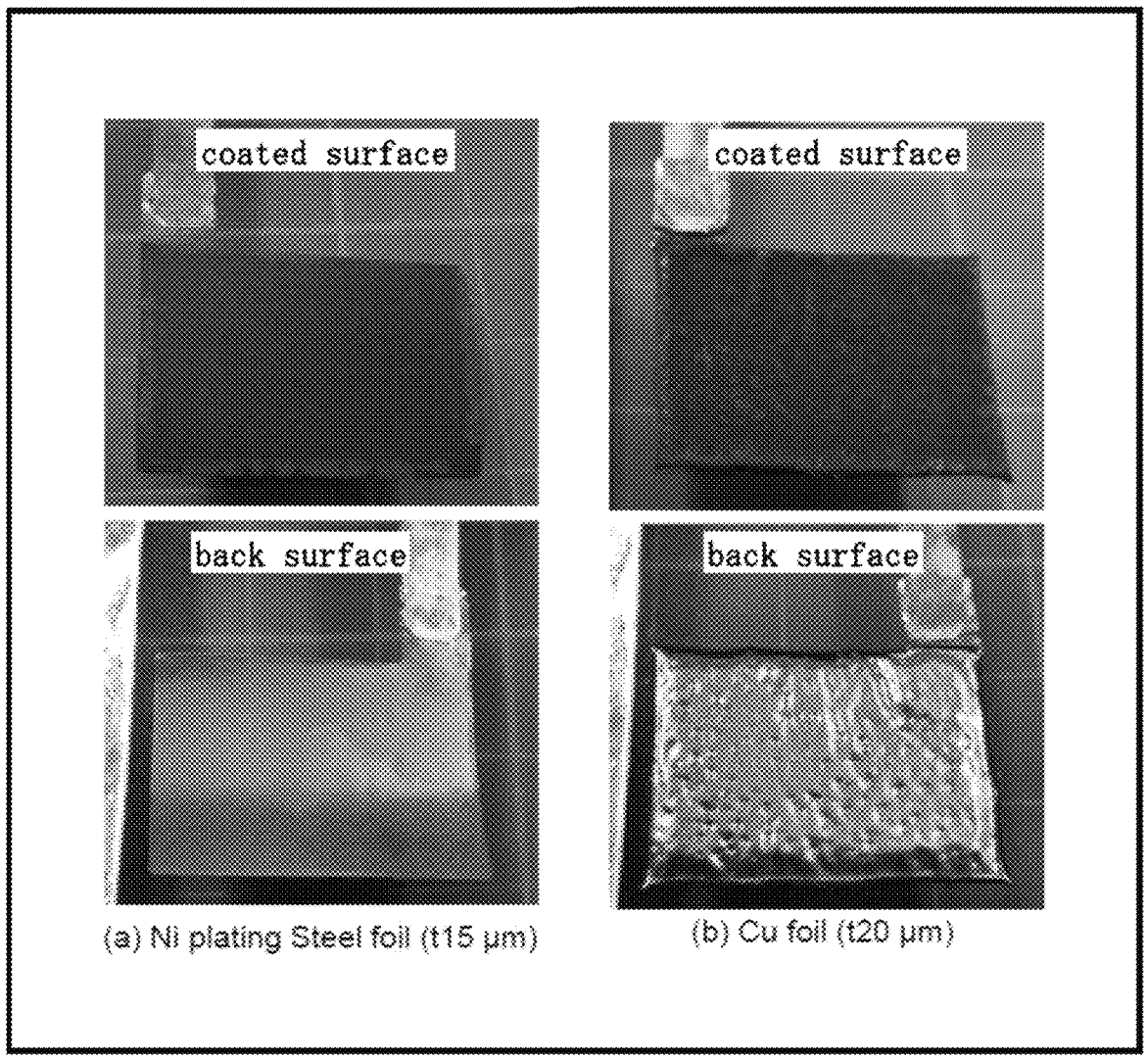
FIG. 19 shows copies of photographs showing collectors of conventional Si negative electrodes.

FIG. 18 shows the cycle life characteristics in Reference Example 1, together with an electrode photograph (on the side of the collector) after 200 cycles. The capacity maintenance rate after 100 cycles to the initial discharge capacity of 2609 mAh/g was 78%. It is considered that, by the formation of the skeleton of the robust inorganic binder (alkali metal silicate) in the active material layer, the conductive network became resistant to destruction due to expansion/contraction of Si, thereby exhibiting excellent capacity maintenance rate. The reason why even thin copper foil could be used without occurrence of distortion is considered that the strength of the inorganic binder (alkali metal silicate) is higher than copper.

<Confirming Analysis of Skeleton-Forming Agent>

Reference Example 3

A test of confirming that the skeleton-forming agent had permeated into die electrode was performed. A simulated electrode was manufactured by: coating copper foil (10 μm) with slurry made of $Al_2O_3$ ($D_{50}$=9 μm), AB, and a PVdF binder and regulating the pressure: coating and impregnating the active material layer with the skeleton-forming agent with a spray gun; and performing heat treatment at 150° C. As the skeleton-forming agent, an alkali metal silicate ($Na_2O.3SiO_2$) was dissolved in water and adjusted to have a solid content of 8 mass %. Note that no surfactant was added. The solid content ratio of the simulated electrode shiny was 85 mass % of $\alpha$-$Al_2O_3$, 5 mass % of CB, and 10 mass % of the PVdF binder.

Reference Example 4

Figure 20:
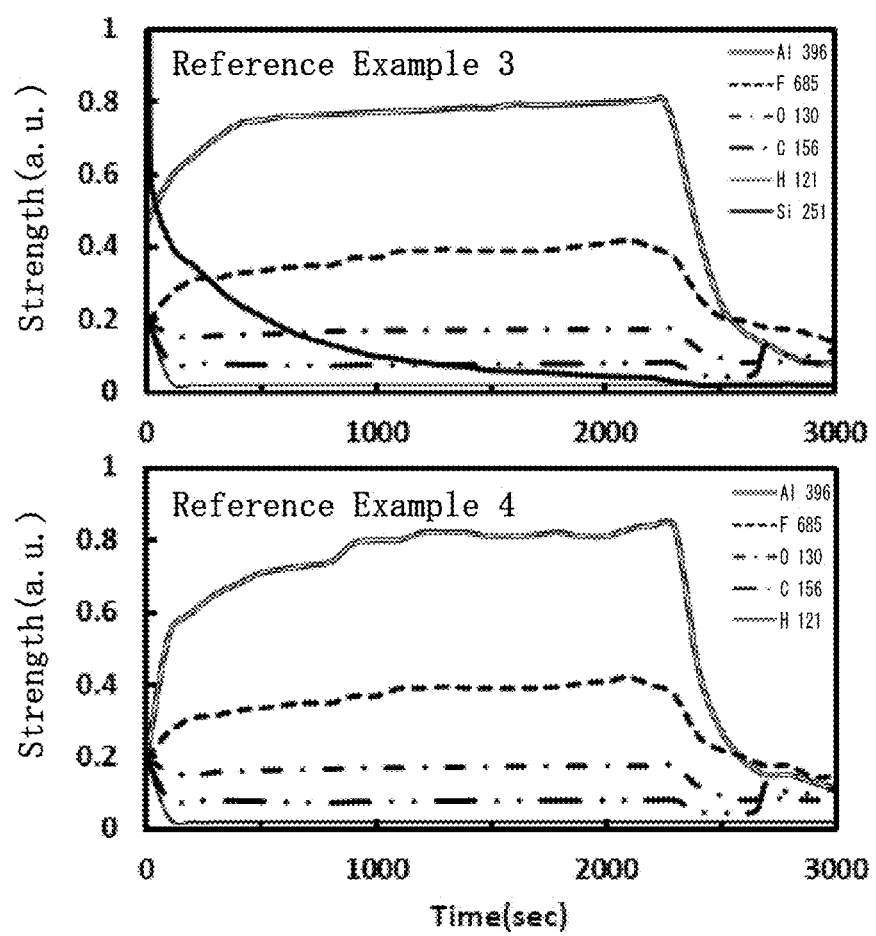
FIG. 20 includes views showing the results of glow discharge emission spectroscopic analysis comparing au electrode coated/impregnated with a skeleton-forming agent to an uncoated/unimpregnated electrode.
Figure 21:
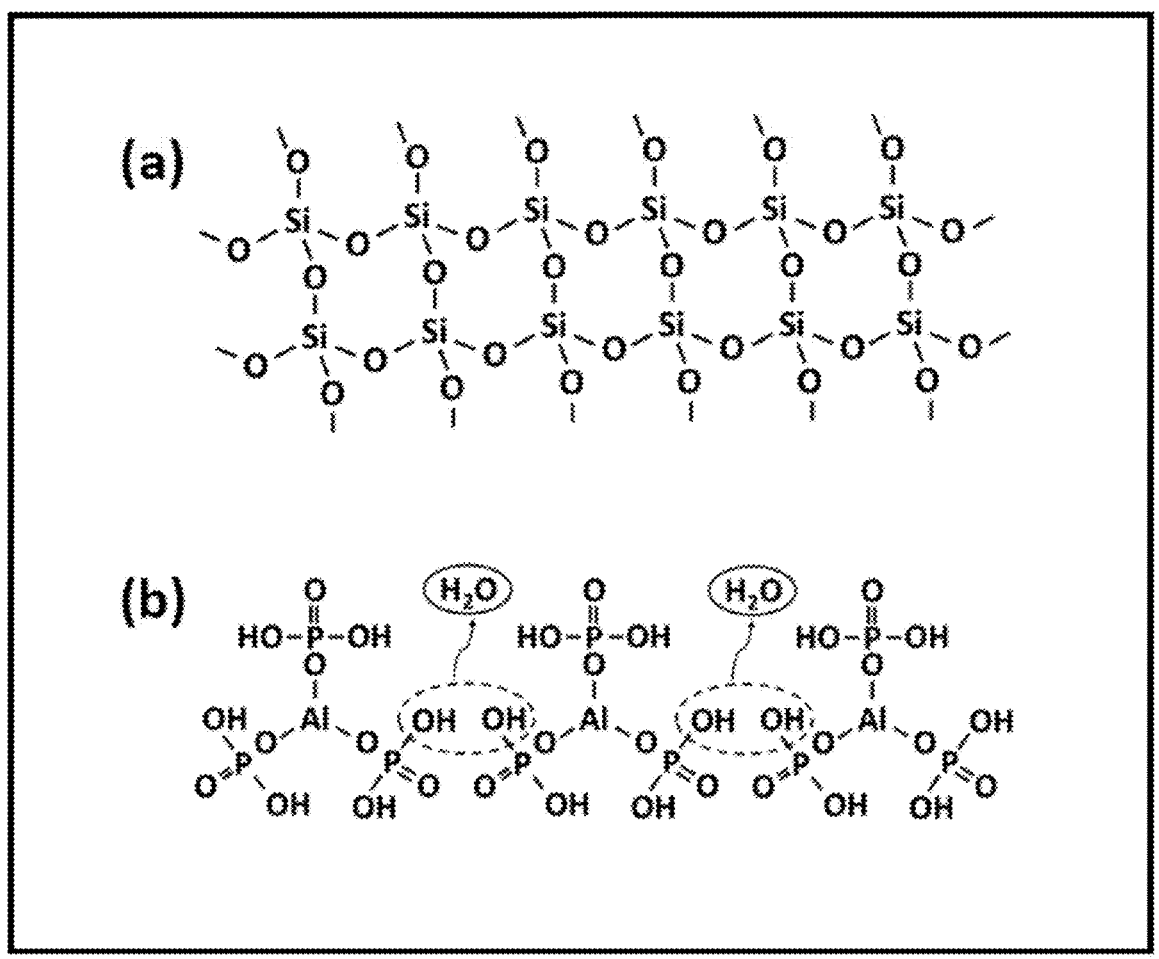
FIG. 21 shows molecular formulas of a silicate and a phosphate.

Reference Example 4 was the same as Reference Example 3 except that the electrode was not coated or impregnated with the skeleton-forming agent as comparison. FIG. 20 shows the results of glow discharge emission spectroscopic analysis (GDS) in Reference Example 3 and Reference Example 4. The GDS measurement conditions were a measured diameter of 4 mm$\phi$ and an Ne gas pressure of 2000 Pa. The measured wavelength was 121 nm for H, 685 nm for F, 130 nm for O, 156 mu for C, 396 nm for Al, and 251 nm for Si. The time of the x-axis represents the sputtering time, which is an index corresponding to the depth of the active material layer (the direction from the electrode surface to tire collector). The strength of the y-axis represents the emission intensity, which is an index corresponding to the content of each element. As is evident from FIG. 20, while presence of Si was not confirmed in Reference Example 4, presence of Si in a deep layer was confirmed, although Si is not present uniformly from the surface to the inside, in Reference Example 3. From these results, it has been proved that, by applying the skeleton-forming agent to the electrode surface, the skeleton-forming agent can permeate into the inside of the active material layer.

While the preferred embodiments of the present invention have been described with reference to the accompanying drawings, various additions, changes, or deletions can be made without departing from the spirit and scope of the present invention. For example, the concentrations and ratios such as the solid content concentration of the alkali metal silicate of the skeleton-forming agent are not limited to the values described in the embodiments. Also, in the above embodiments, although $A_2O.3SiO_2$ (A=Li, Na) was described as the alkali metal silicate, A is not limited to Li and Na, and the coefficient of $SiO_2$ is not limited to 2 to 3. Likewise, the phosphate of the skeleton-forming agent is not limited to the aluminum primary phosphate ($Al_2O_3.3P_2O_5$), and the coefficient of $P_2O_5$ is not limited to 3. It is therefore to be understood that these modifications are also included within the scope of the present invention.

The invention claimed is:

1. An electrode for a lithium ion battery, comprising a skeleton-forming agent for skeleton formation of an active material layer of the electrode,
wherein the active material layer includes an active material capable of forming an alloy with lithium or an active material capable of occluding lithium ions and a binder,
wherein the skeleton-forming agent is permeated into the active material layer such that the skeleton-forming agent is on a surface of the active material layer and in the active material layer, thereby covering the active material and the binder inside the active material layer, and a space is produced between active material particles in the active material layer,
wherein the skeleton-forming agent includes a silicate having a siloxane bond as an ingredient,
wherein the silicate of the skeleton-forming agent has a crystalline or amorphous structure represented by general formula $A_2O.nSiO_2$, and
where A is at least one kind selected from Li, Na, K, a triethanol ammonium group, a tetramethanol ammonium group, a tetraethanol ammonium group, and a guanidine group, and n is greater than or equal to 1.6 and less than or equal to 3.9.

2. The electrode according to claim 1, having a layer including alkali-resistant inorganic particles on the active material layer.

3. The electrode according to claim 1, wherein the active material includes a Si-based material.

4. The electrode according to claim 3, wherein the Si-based material has a median diameter ($D_{50}$) greater than or equal to 0.1 μm and less than or equal to 10 μm, and an oxygen content included in the Si-based material is 0.5 to 30 mass %.

5. The electrode according to claim 3, wherein the Si-based material exhibits a shape selected from the group consisting of a facet shape, a belt shape, a fiber shape, a needle shape, a flake shape, and a donut shape, and further includes a work-affected layer.

6. A lithium ion battery comprising the electrode according to claim 1.

7. An electric apparatus comprising the battery according to claim 6.

8. The electrode according to claim 1, wherein the electrode is a negative electrode.

9. The electrode according to claim 8, wherein the active material includes a Si-based material, the Si-based material has a median diameter ($D_{50}$) greater than or equal to 0.1 μm and less than or equal to 10 μm, and an oxygen content included in the Si-based material is 0.5 to 30 mass %.

10. The electrode according to claim 9, wherein the Si-based material exhibits a shape selected from the group consisting of a facet shape, a belt shape, a fiber shape, a needle shape, a flake shape, and a donut shape, and further includes a work-affected layer.

11. A lithium ion battery comprising the electrode according to claim 8.

12. An electric apparatus comprising the battery according to claim 11.

13. The electrode according to claim 1, wherein the electrode is a negative electrode for a lithium ion battery including Si-based material in the active material.

14. The electrode according to claim 1, wherein A of the general formula is Li or Na, and n is greater than or equal to 2.0 and less than or equal to 3.5.

15. The electrode according to claim 1, wherein the active material layer is formed on a surface of a collector.

* * * * *